United States Patent
Chen et al.

(10) Patent No.: US 8,202,820 B2
(45) Date of Patent: Jun. 19, 2012

(54) NON-STOICHIOMETRIC MIXED-PHASE TITANIA PHOTOCATALYST

(75) Inventors: Le Chen, Lakewood, CO (US);
Kimberly A. Gray, Evanston, IL (US);
Michael E. Graham, Evanston, IL (US)

(73) Assignee: Northwestern University, Evanston, IL (US)

( * ) Notice: Subject to any disclaimer, the term of this patent is extended or adjusted under 35 U.S.C. 154(b) by 95 days.

(21) Appl. No.: 12/583,763

(22) Filed: Aug. 25, 2009

(65) Prior Publication Data
US 2010/0108488 A1  May 6, 2010

Related U.S. Application Data

(60) Provisional application No. 61/190,146, filed on Aug. 26, 2008.

(51) Int. Cl.
*B01J 23/00* (2006.01)
*C23C 14/00* (2006.01)
*C23C 14/06* (2006.01)
*C23C 14/32* (2006.01)
*C25B 11/00* (2006.01)
*C25B 13/00* (2006.01)

(52) U.S. Cl. ........... 502/350; 204/192.1; 204/192.15; 204/298.12; 204/298.13; 427/530

(58) Field of Classification Search .......... 502/350; 204/192.1, 192.15, 298.12, 298.13; 427/530
See application file for complete search history.

(56) References Cited

U.S. PATENT DOCUMENTS

| | | | |
|---|---|---|---|
| 4,428,811 A | 1/1984 | Sproul et al. | 204/192.13 |
| 5,789,071 A | 8/1998 | Sproul et al. | 428/216 |
| 6,875,319 B2 * | 4/2005 | Nadaud et al. | 204/192.1 |
| 7,052,585 B2 * | 5/2006 | Veerasamy et al. | 204/192.16 |
| 7,238,628 B2 * | 7/2007 | Demaray et al. | 438/785 |
| 2004/0115362 A1 * | 6/2004 | Hartig et al. | 427/446 |
| 2010/0307593 A1 * | 12/2010 | Thimsen et al. | 136/263 |

OTHER PUBLICATIONS

"The effect of substrate temperature on the properties of d.c. reactive magnetron sputtered titanium oxide films," Li-jian Meng et al. Thin Solid Films 223 (1993), pp. 242-247.*
"A comparison of mixed phase titania photocatalytsts prepared by physical and chemical methods: The importance of the solid-solid interface," Gonghu Li et al. Journal of Molecular Catalysis A: Chemical 275 (2007), pp. 30-35.*
"Synthesizing mixed-phase TiO2 nanocomposites using a hydrothermal method for photo-oxidation and photoreduction applications," Gonghu Li et al. Journal of Catalysis 253 (2008), pp. 105-110.*
"Visible light photocatalytic properties of anion-doped TiO2 materials prepared from a molecular titanium precursor," Gonghu Li et al. Chemical Physics Letters 451 (2008), pp. 75-79.*
"The effect of Nb substitution on synthesis and photo-response of TiO2 thin films prepared by direct current magnetron sputtering," Paul A. DeSario et al. Thin Solid Films 519 (2011), pp. 3562-3568.*
"Fabricating highly active mixed phase TiO2 photocatalysts by reactive DC magnetron sputter deposition," Le Chen et al. Thin Solid Films 515 (2006), pp. 1176-1181.*

(Continued)

*Primary Examiner* — Patricia L Hailey

(57) ABSTRACT

A mixed anatase-rutile phase, non-stoichiometric titania photocatalyst material is a highly reactive and is a UV and visible light responsive photocastalyst in the as-deposited condition (i.e. without the need for a subsequent thermal treatment). The mixed phase, non-stoichiometric titania thin film material is non-stoichiometric in terms of its oxygen content such that the thin film material shows a marked red-shift in photo-response.

12 Claims, 13 Drawing Sheets

OTHER PUBLICATIONS

M. Anpo, et al., Design and Development of Titanium and Vanadium Oxide Photocatalysts Incorporated within Zeolite Cavities and their Photocatalytic Reactivities, Journal of Industrial and Engineering Chemistry, vol. 6, No. 2, Mar. 2000, pp. 59-71.

M. Anpo, et al., The design and development of highly reactive titanium oxide photocatalysts operating under visible light irradiation, Journal of Catalysts, 216, (2003), pp. 505-516.

M. Anpo, Preparation, characterization and reactivities of highly functional titanium oxide-based photocatalysts able to operate under UV-visible light irradiation: Approaches in realizing high efficiency in the use of visible light, Bulletin of the Chemical Society of Japan, 77, (2004), pp. 1427-1442.

R. Asahi, et al., Visible-Light Photocatalysis in Nitrogen-Doped Titanium Oxides, Science, 293, (2001), pp. 269-271.

G. Atanassov, et al., Optical properties of $TiO_2$, $Y_2O_3$ and $CeO_2$ thin films deposited by electron beam evaporation, Thin Solid Films, 223, (1993), pp. 288-292.

S. Azad, et al., Adsorption and reaction of Co and $CO_2$ on oxidized and reduced $SrTiO_3$(100) surfaces, J. Phys. Chem. B, 109 ,(2005) pp. 10327-10331.

R.R. Basca, et al., Effect of rutile phase on the photocatalytic properties of nanocrystalline titania during the degradation of p-coumaric acid, Applied Catalysis B: Environmental, 16, (1998), pp. 19-29. Abstract.

H. Baránkova, et al., Hysteresis effects in the sputtering process using two reactive gases, Thin Solid Films, 260, (1995), pp. 181-186.

S. Berg and T. Nyberg, Fundamental understanding and modeling of reactive sputtering processes, Thin Solid Films, 476, (2005), pp. 215-230.

L. Chen, et al., Photoreduction of $CO_2$ by $TiO_2$ nanocomposites synthesized through reative direct current magnetron sputter deposition, Thin Solid Films 517, (2009), pp. 5641-5645.

L. Chen, et al., Fabricating highly active mixed phase $TiO_2$ photocatalysts by reactive DC magnetron sputter deposition, Thin Solid Films 515, (2006), pp. 1176-1181.

L. Chen, et al., Nitrogen stabilized reactive sputtering of optimized $TiO_{2-x}$ photocatalysts with visible light reactivity, J.Vac.Sci.Technol. A, 27(4), Jul./Aug. 2009, pp. 712-715.

J. Choi, et al., Effects of single metal-ion doping on the visible-light photoreactivity of $TiO_2$, J. Phys. Chem. C, 114, (2010), pp. 783-792.

A. Di Paola, et al., Preparation of polycrystalline $TiO_2$ photo-catalysts impregnated with various transition metal ions: Charatcerization and photocatalytic activity for the degradation of 4-nitrophenol, J. Phys. Chem. B 106, (2002) pp. 637-645.

A.V. Emeline, et al., Photoinduced formation of defects and nitrogen stabilization of color centers in N-doped titanium dioxide J. Phys. Chem. C, 111, (2007), pp. 11456-11462.

A. Fujishima and K. Honda, Electrochemical photolysis of water at a semiconductor electrode, Nature, 238, (1972) pp. 37-38.

A. Gandhe, et al., $TiO_2$: As a versatile catalyst for the ortho-selective methylation of phenol, Journal of Molecular Catalysis A: Chemical, 238(1-2), (2005), pp. 63-71.

M. Grätzel, Photoelectrochemical cells, Nature, 414, (2001), pp. 338-344.

D.C. Hurum, et al., Explaining the enhanced photocatalytic activity of Degussa P25 Mixed-Phase $TiO_2$ using EPR, J. Phys. Chem. B, 107, (2003), pp. 4545-4549.

D.C. Hurum, et al., Probing reaction mechanisms in mixed phase $TiO_2$ by EPR, Journal of the Electron Spectroscopy and Related Phenomena, 150, (2006), pp. 155-163.

D.C. Hurum, et al., Recombination Pathways in the Degussa P25 Formulation of $TiO_2$: Surface versus Lattice Mechanisms, J. Phys. Chem. B, 109, (2005) pp. 977-980.

H. Irie, et al., Nitrogen-Concentration Dependence on Photo-catalytic Activity of $TiO_{2-x}N_x$ Powders, J. Phys. Chem. B, 107, (2003), pp. 5483-5486.

T. Kawahara, et al., Photocatalytic activity of rutile-anatase coupled $TiO_2$ particles prepared by a dissolution-reprecipitation method, Journal of Colloid and Tinerface Science, 276,(2003) pp. 377-381.

H. Kikuchi, et al., Extending the Photoresponse of $TiO_2$ to the Visible Light Region: Photoelectrochemical Behavior of $TiO_2$ Thin Films Prepared by the Radio Frequency Magnetron Sputtering Deposition Method, J. Phys. Chem. B, 110, (2006), pp. 5537-5541.

V. Kuznetsov and N. Serpone, Visible Light Absorption by Various Titanium Dioxide Specimens, J. Phys. Chem. B, 110, (2006) pp. 25203-25209.

G. Li and K. Gray, Preparation of Mixed-Phase Titanium Dioxide Nanocomposites via Solvothermal Processing, Chem. Mater., 19, (2007), pp. 1143-1146.

D. Lowndes, et al., Synthesis of novel thin-film materials by pulsed laser deposition, Science, 16, (1996), pp. 898-903. Summary.

A. Markovits, et al., Spin location for NO adsorption on surface O atoms of metal oxides, Catalysis Today, 113, (2006), pp. 201-207.

Matsuka, Photocatalysis for new energy production—Recent advances in photcatalytic water splitting reactions for hydrogen production, Catalysis Today, 122, (2007), pp. 51-61.

S. Schiller, et al., On the investigation of D.C. plasmatron discharges by optical emission spectrometry, Thin Solid Films, 96, (1982), pp. 235-240.

N. Serpone, Is the band gap of pristine $TiO_2$ narrowed by anion- and cation-doping of titanium dioxide in second-generation photocatalysts?, J. Phys. Chem. B, 110, (2006), pp. 24287-24293.

D. Severin, et al., Process stabilization and increase of the deposition rate in reactive sputtering of metal oxides and oxy-nitrides, Appl. Phys. Lett., 88, (2006), pp. 161504(1-3).

W.D. Sproul, et al., Reactive direct current magnetron sputtering of aluminum oxide coatings, J. Vac. Sci. Technol. A, 13(3), May/Jun. 1995, pp. 1188-1191.

W.D. Sproul, et al., Advances in partial-pressure control applied to reactive sputtering, Surface and Coatings Technology, 39/40, (1989) pp. 499-506.

W.D. Sproul, et al., Reactive d.c. magnetron sputtering of the oxides of Ti, Zr, and $Hf^1$, Surface and Coatings Technology, 89, (1997) pp. 10-15.

W.D. Sproul, et al., Control of reactive sputtering processes, Thin Solid Films, 491, (2005), pp. 1-17.

J. Szczyrbowski, et al., Reactive sputtering of dielectric layers on large scale substrates using an AC twin magnetron cathode, Surface and Coatings Technology, 93, (1997), pp. 14-20.

S. Takeda, et al., Photocatalytic $TiO_2$ thin film deposited onto glass by DC magnetron sputtering, Thin Solid Films, 392, (2001), pp. 338-344.

T.L. Thompson and J.T. Yates, $TiO_2$-based photocatalysis: surface defects, oxygen and charge transfer, Topics in Catalysis, vol. 35, (2005), pp. 197-210.

P. Usubharatana, et al., Photocatalytic Process for $CO_2$ Emission Reduction from Industrial Flue Gas Streams, Ind. Eng. Chem. Res., 45, (2006), pp. 2558-2568.

S.H. Wang, et al., Nanocolumnar titania thin films uniquely incorporated with carbon for visible light photocatalysis, Applied Catalysis B: Environmental, 76, (2007), pp. 328-334.

M. Wong, Reactively sputtered N-doped titanium oxide films as visible-light photocatalyst, Thin Solid Films, 494, (2006),p. 244-249.

B.D. Yao, Formation of ZnO nanostructures by a simple was of thermal evaporation, Appl. Phys. Lett. 81, (2002), pp. 757-759.

J. Yu, et al., Effects of hydrothermal temperature and time on the photocatalytic activity and microstructures of bimodal mesoporous $TiO_2$ powders, Applied Catalysis B: Environmental, 69, (2007), pp. 171-180.

P. Zeman and S. Takabayashi, Effect of total and oxygen partial pressures on structure of photocatalytic $TiO_2$ films sputtered on unheated substrate, Surface and Coatings Technology, 153, (2002), pp. 93-99.

H. Zhang, et al., Thermodynamic analysis of phase stability of nanocrystalline titania J. Mater. Chem., 8,(1998),pp. 2073-2076.

* cited by examiner

NON-STOICHIOMETRIC MIXED-PHASE TITANIA PHOTOCATALYST

This application claims benefits and priority of provisional application Ser. No. 61/190,146 filed Aug. 26, 2008, the disclosure of which is incorporated herein by reference.

CONTRACTUAL ORIGIN OF THE INVENTION

This invention was made with government support under Grant No. DE-FG02-03ER15457/A003 and DE-AC02-06CH11358 awarded by the Department of Energy. The Government has certain rights in the invention.

FIELD OF THE INVENTION

The present invention relates to titania photocatalysts and, more particularly, to a mixed phase, non-stoichiometric titania photocatalyst material.

BACKGROUND OF THE INVENTION

Titanium dioxide ($TiO_2$) is one of the most widely studied semiconductor photocatalysts for a wide array of applications. Currently there is particular interest in uses associated with energy production such as water splitting [references 1, 2] and photochemical solar cells [reference 3]. There are also a number of reports demonstrating that $TiO_2$ photoreduces $CO_2$ to chemical fuels like methane, methanol, carbon monoxide etc and thus, provides a carbon neutral energy production and consumption cycle [references 4-6]. However, the major hurdle in synthesizing titania based photocatalysts for solar fuel generation is to prepare materials that have high reactivity with low recombination rates of charge carriers, and strong visible light absorbance.

There are several approaches to enhance titania's photoefficiency and photoresponse. Based on the electron paramagnetic resonance (EPR) results by Hurum et al., it was proposed that $TiO_2$ with mixed phases of anatase and rutile tends to exhibit higher photoactivity than pure phases alone and has a visible light response [references 7-9]. When anatase and rutile crystals are effectively intermixed with each other, there exist solid-solid interfaces across which photoexcited electrons are transferred from rutile to lower energy anatase lattice trapping sites, thus, hindering the recombination of electrons and holes. Rutile acts as an antenna (because of its light absorption up to about 410 nm) to extend the photo response of the mixed phase catalyst into the visible light region. There are also unique tetrahedrally coordinated $Ti^{4+}$ trapping sites associated with the solid-solid interfaces of the nano-particles [reference 9]. Mixed phase titania nanocomposites have been synthesized with a high density of solid-solid interfaces by reactive direct current (DC) magnetron sputtering [reference 10]. They showed enhanced photo-activity for both oxidative and reductive chemistry [reference 10] as well as red-shifted photo-response compared to pure phase titania and mixed phase titania synthesized by solvo-thermal methods.

Oxygen vacancies can be created by doping anions such as N or C, or transition metals such as Nb, Al, etc. into $TiO_2$ films [references 12-17] as ways to extend $TiO_2$'s photoresponse by introducing intermediate surface states that narrow the band gap. Based on diffuse reflectance spectra (DRS) measurements of powder samples, Serpone et al. [reference 18-20], on the other hand, argued that the dopants at low concentration induce the formation of oxygen vacancies that merely create 'color centers' rather than narrowing the band gap by the creation of surface states. While at high concentration, the dopants may be able to narrow the band gap [reference 20]; but the doping materials are also reported to introduce recombination centers for electrons and holes [reference 17, 21], or cause thermal instability problems (mostly for doping metals) [reference 22]. Furthermore, at heavy doping levels the material has extremely different chemical composition and band gap electronic structure.

Oxygen vacancies may also be directly introduced into titania in the absence of dopants during titania formation or after post-deposition annealing or plasma treatment [reference 23]. It is difficult however, to control and finely tune these high energy techniques. Non-stoichiometric titania is reported to display a red shifted photo-response similar to most doped titanias [references 24, 25], and displays both positive and negative influences on photo-reactivity according to the literature. For example, Justicia, et al. [reference 25] stated that a band of defect states existed just below and overlapped with the conduction band minimum, and these states facilitated the transfer of photocarriers to the active sites on the surface. Yates, et al. [reference 23] created bulk and surface oxygen vacancies on stoichiometric rutile (110) and in the subsequent $CO_2$ adsorption experiments, oxygen vacancies on the surface served as adsorption sites. In contrast, Satoshi Takeda, et al., suggested that, oxygen vacancies created energy levels around mid-band gap that served as recombination centers for electrons and holes [reference 26].

Mixed-phase titanium dioxide ($TiO_2$) materials, such as commercially available Degussa P25, show enhanced photoactivity largely due to the synergistic interactions between anatase and rutile phases, which serve to extend their photoresponse to longer wavelengths of light, separate and stabilized charge carriers so as to hinder charge recombination, and create catalytic active sites located at the solid-solid interface. However, improvements in performance are still needed.

SUMMARY OF THE INVENTION

The present invention provides a mixed phase, non-stoichiometric titania material that comprises a highly reactive and UV and visible light responsive photocastalyst as deposited on a substrate. The mixed phase, non-stoichiometric titania photocatalytic material comprises a nanocomposite of intermixed anatase and rutile phases and is non-stoichiometric in terms of its oxygen content such that the thin film material shows a marked red-shift in photoresponse (absorbance in the visible light wavelength range).

In an illustrative embodiment of the present invention, a mixed phase, non-stoichiometric titania (e.g. $TiO_{2-x}$) photocatalytic thin film or layer comprises a majority (e.g. 50-80% by weight) of anatase phase and a minority of rutile phase and is deposited by reactive DC magnetron sputtering at the low-oxygen end of the transition mode to have a columnar morphology, wherein columnar bundles of anatase-rutile intermixed nanocolumns are present and provide two kinds of phase interfaces; i.e. those among bundles and those between the nano-columns within the bundles). For purposes of further illustration and not limitation, columnar structures have larger columns (100-500 nm diameter) which comprise bundles of smaller columns or crystallites of anatase (20-40 nm individual column diameter) and rutile (10-20 nm individual column diameter) that provide high interfacial areas of anatase and rutile. The rutile phase is uncharacteristically small especially relative to the anatase phase and both phases are very small (e.g. less than 50 nm diameter columns).

The columnar crystals are oriented at an angle of less than 90 degrees, such as for example about 45 degrees or other angles, to a flat substrate surface. The partial pressure of oxygen is controlled at a very low level in the transition mode, preferably with trace nitrogen stabilization, so as to deposit the mixed phase, non-stoichiometric titania photocatalytic thin film, whereby the deposited thin film is highly reactive and UV and visible light responsive in the as-deposited condition (i.e. without subsequent thermal treatment such as annealing).

The present invention also envisions a method of photocatalytically reacting, either in an oxidative or reductive reaction, a reactant by contacting the reactant and the above photocatalyst material under UV or visible light illumination. For example, the mixed phase, non-stoichiometric titania photocatalytic thin film can successfully photoreduce $CO_2$ to fuel (methane) with the addition of water as a hole scavenger under both UV and visible light illumination. The photoreduction of $CO_2$ to methane provides a carbon-neutral energy alternative to fossil fuels.

Other advantages of the present invention will become apparent from the following detailed description taken with the following drawings.

DETAILED DESCRIPTION OF THE INVENTION

Figure 1:
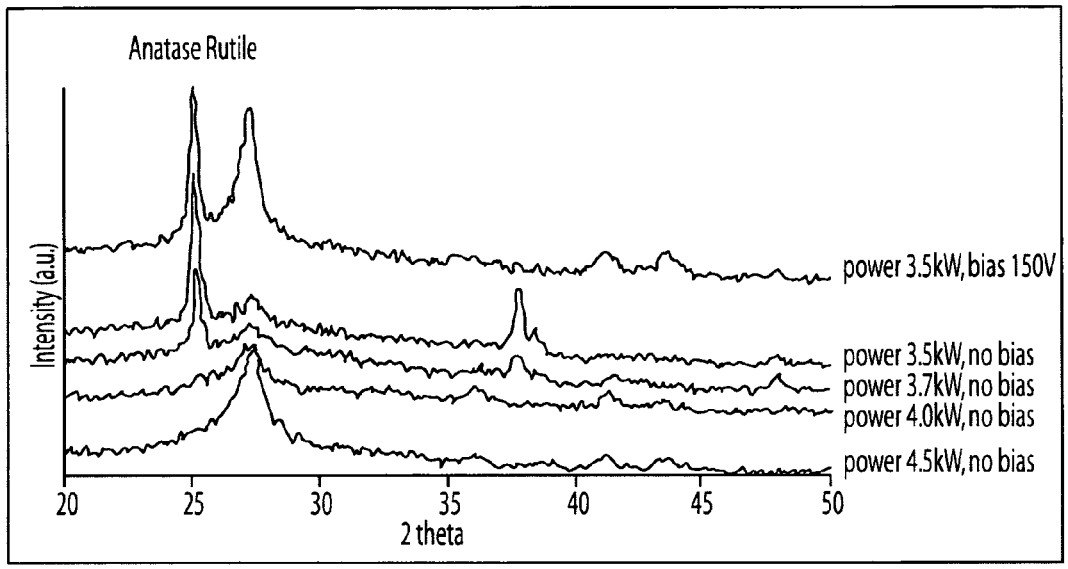
FIG. 1 shows XRD of sputtered titania films prepared under different sputtering powers and target bias.

In an illustrative embodiment, the present invention provides a mixed phase, non-stoichiometric (oxygen deficiency) titania photocatalyst material (e.g. $TiO_{2-x}$) that is deposited as a thin film or layer on a substrate by a physical vapor deposition process, such as reactive DC magnetron sputtering for purposes of illustration and not limitation. The mixed phase, non-stoichiometric titania material comprises a nanocomposite of intermixed anatase phase and rutile phase and is non-stoichiometric in terms of its oxygen content (oxygen deficient relative to $TiO_2$ composition) such that the thin film material shows a marked red-shift in photoresponse (absorbance in the visible light wavelength range). The mixed phase, non-stoichiometric titania photocatalyst material comprises a highly reactive and UV and visible light responsive photocastalyst as deposited on a substrate (i.e. in the as-deposited condition on the substrate without the need for a subsequent thermal treatment), although a subsequent thermal treatment may be used. Thermal treatments optionally can be used to move non-equilibrium structures in the direction of equilibrium but the sputtered metastable structures provide benefits described herein. Sputtering creates metastable structures that are not possible by equilibrium based chemical processes and also creates "stabilized" interfacial defect sites, obviating the need for anion/cation dopants in so much as they are used to create a population of defects such as vacancies. Although the Examples describe use of glass (borosilicate) and certain other substrates, various other substrates can be used including, but not limited to, metals (e.g. Al), Si, sapphire, and others. The choice of substrates does affect the nucleation and growth so that deposition conditions for a specific structure may have to be modified if two films with the same phase ratio are to be compared but on different substrates.

DC magnetron sputtering provides a deposition alternative to control the synthesis of the non-stoichiometric titania by monitoring oxygen partial pressure during the sputtering without post-deposition treatment. There are three deposition modes based on the oxidation states of the target: the oxide mode, the transition mode and the metal mode. The metal mode provides a high rate of deposition but insufficient reactive gas, whereas the oxide mode provides excessive reactive gas but very low deposition rates, and results in nominally stoichiometric films. When reactive DC magnetron sputtering is employed in practice of the invention to deposit the material, the following parameters are considered:

1) Pulsed power or arc suppression technique (superimposed positive pulse at some frequency that minimizes arcing for the target) is necessary to have a stable sputtering process because relatively nonconductive oxide forms on the surface of the target where sputtering is insufficient to keep it free. Frequencies in the range of 2-100 kHz are used, but higher frequencies can be beneficial as well.

2) The use of a pure metal (Ti) target with separate insertion of oxygen gives control of Ti:O ratio and helps optimize (maximize) the sputtering rate (a practical matter).

3) Operate in total pressure (argon+reactive gas) regime of 0.2-1.3 Pa (typical) or broader range as required to optimize deposition rates and phase composition (Rutile:Anatase).

4) Substrate temperature is ambient to <200° C. (process is self heating), although additional heating can be used with suitable adjustment of other parameters to maintain, phase ratio, crystallinity, and oxygen vacancy concentration.

5) Partial pressure of oxygen is such that the process operates in the transition mode (between fully oxidized and metallic mode). In the processing system used the examples, it is critical that the control mode is "partial pressure" or a related signal, since merely controlling to a "flow rate" set point will not allow the transition region to be exploited. Only the use of a partial pressure set point (e.g., mass spectrometer real time closed loop feedback signal) for controlling the flow of oxygen will allow this control. In Examples below, 0.12 to 0.07 pa for $O_2$, assures an oxygen deficient structure.

6) Pulsed dc or rf bias voltage on the substrate to provide ion bombardment of the growing film. Voltage and ion density determine energy input to film for adatom mobility affecting crystallinity, and phase formation. Values of rf bias are used that impose a dc negative voltage on the substrate of 0 to −200V. The importance of pulsed dc or rf voltage is due to the same effects as discussed with respect to the target. Charge build up on the oxide surface would create arcs and would shield the surface from ion bombardment.

7) Flux angle for deposited material on the substrate is also considered in controlling surface texture, growth patterns, crystallinity, surface area and phase relationships. Lower angles promote the growth of films that are somewhat porous because of shadowing effects (line of site process), thus increasing surface area, but also affect growth kinetics and thus, crystallite sizes, phase relationships, etc. Applicants have explored down to 30 degrees, incidence angle (relative to the plane of the substrate), and found it to be the best condition tested. It may be that a further reduced angle could still improve our results.

8) Addition of nitrogen to the sputtering gas achieves multiple benefits, the most apparent being stabilization of the process in terms of oxygen flow control in critical regions (low partial pressure in the transition mode). It also impacts the growth of the film, however, and enhances crystallinity (relative to the condition without nitrogen) without being incorporated into the film. It appears to help us further fine tune the structure for improved performance. Amounts of nitrogen expressed as a percentage of the oxygen partial pressure that applicants have found to be useful are as low as 5% to 10%. Other gases may help stabilize the process (e.g., $H_2$) but it is not clear what effect they would have on the film growth and resultant performance. It should be noted that the conditions discussed above are in one sense, unique to the particular sputtering system employed, since sputtering chamber geometry, magnetic field strengths, pumping rates, etc. can all have significant effects on the actual values one uses to create the films described here. Also, it is also important to note that there is much interdependence of parameter values, in that there is considerable overlap in their effect on "energy input" to the film, for instance. Thus, a range of parameter combinations that yield optimal results relative to some desired performance level can be used.

The following Examples are offered for purposes of illustration of the present invention without limiting the invention.

EXAMPLE 1

Nancomposite photocatalysts having phase compositions ranging from pure anatase to pure rutile (and mixtures in between) were prepared by reactive sputter deposition using reactive DC magnetron sputtering, with rf bias, onto cleaned microscope glass slides (borosilicate). Pure titanium (99.95% pure) was used as the sputtering target. High-purity argon and oxygen were used as sputtering and reactive gas, respectively. The sputtering system was a box style coater having an unbalanced magnetron with closed field configuration as described in W. S. Sproul, et al. J. Vac. Sci. Technol., A 13 (3) May/June, 1995, which is incorporated herein by reference. The sputtering chamber comprised a stainless box (about 32×32×32 inches with load lock chamber at the top. Titanium targets employed are available from Gencoa Ltd., in a size of 406× 128 mm. Power supplies comprised Advanced Energy MDX 10K W supplies. Arc suppression was provided by Advanced Energy Sparc-1e V device. Gas flow controller comprised MKS model 260 mass flow controller modules modified to accept input from a mass spectrometer, which was a Quadrupole mass spectrometer (Spectra Vacscan Plus). Pressure gauges were MKS Baratron model 690A with Type 270 pressure controller, Granville Phillips 360 Stabil-1 convectron and ionization gauges. RF bias supply was Advanced Energy RFX II (3 KW) power supply and TCM tuner/matching network A high vacuum pump for the coating chamber comprised CTI 8 cryopump by Helix technologies.

In making the titania thin films in this Example, the sputtering power level was in the explored range of 3.0 to 5.8 kW (see FIG. 1) with no applied rf bias (self bias is typically −15 to −30 dcV without applying a bias) or an rf-induced dc-bias of −150 volts and total pressure of argon and oxygen was in the range 0.4-0.8 Pa. The partial pressure of oxygen in this example was nominally 0.12 Pa.

Figure 1A:
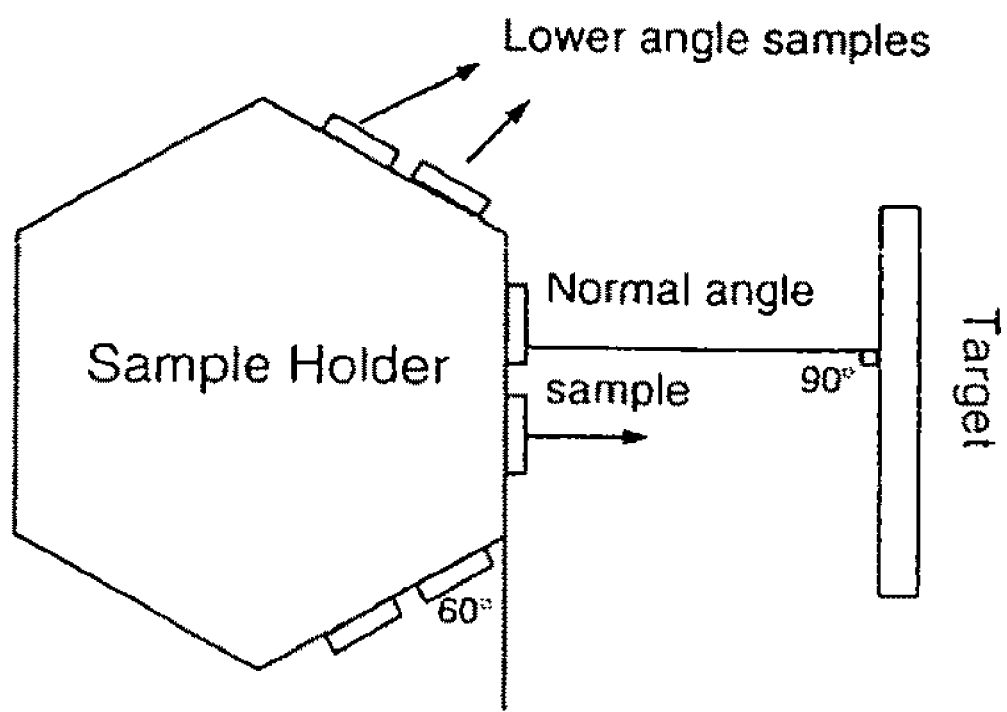
FIG. 1a shows sample positions relative to the sputtering target wherein one side of the sample holder is parallel to the target to receive the high angle deposition, while the samples on the side of the sample holder receive deposition at a 30 degree angle of incidence.

FIG. 1a shows sample positions relative to the target wherein one side of the sample holder is parallel to the target to receive the high angle deposition, while the samples on the other side of the sample holder received deposition at approximately 30 degrees angle of incidence. Control of the partial pressure of reactive gases is achieved using feedback from a mass spectrometer as described in Sproul, W. D., et al., *Advances in Partial-Pressure Control Applied to Reactive Sputtering*. Surface & Coatings Technology, 1989. 39(1-3): p. 499-506 and in W. S. Sproul, et al. J. Vac. Sci. Technol., A 13 (3) May/June, 1995, both incorporated herein by reference.

The deposited materials were characterized with a variety of techniques, including spectral absorption behavior, AFM (atomic force microscope), XRD (x-ray diffraction), EPR (electron paramagnetic resonance), and TEM (transmission electron microscopy). They were tested in the gas phase oxidative degradation of acetaldehyde and in the gas phase reduction of $CO_2$ to methane in the presence of $H_2O$. Further discussion of characterization (structure analysis) and performance (photocatalytic activity) are presented below.

The XRD (x-ray diffraction) patterns for typical as-deposited films are shown in FIG. 1, including the pure phase, as well as the mixed phase with different phase compositions. The XRD patterns provide several pieces of information including, which crystalline phases are present (peak locations), relative amounts of each phase (integrated area under respective peaks), crystallite size (peak width at half max) and relative in-plane crystallographic texture for the thin film samples (which peaks are present and relative magnitudes for a given phase).

As seen in the FIG. 1, it is typical of the sputtered titania films that the rutile phase has a dominant (110) crystal orientation ($2\Theta=27°$) and the anatase has a dominant (101) crystal orientation ($2\Theta=25°$). These structures are technically metastable because they are deposited at relatively low temperature, but in fact are stable at ambient temperature and likely up to a few hundred degrees Celsius. The energetic deposition process provides localized energy (ion bombardment) that must be considered the equivalent of a moderate temperature (few hundred degrees) during film growth. In the mixed phase regime, additions of energy tend to increase the amount of rutile present, although the anatase phase stability is somewhat enhanced relative to rutile by its nanoscale dimensions. Energy input to the film can be controlled by target power (kinetic energy of sputtered neutrals), total pressure (number of gas phase collisions for neutrals and ions), gas species/charge (argon sputter gas and oxygen reactive gas), and substrate bias voltage (energy of bombarding argon ions). The main effect of "energy" at the substrate is to provide adatom mobility for crystalline growth (without the use of higher temperatures) and in some cases, to re-sputter atoms that are weakly bonded or form energetically unstable nuclei. This affects preferred growth orientations as well as crystallite size and film density. At moderate energy levels (a few eV to tens of eV), the result is columnar growth which is more or less dense, depending on the amount of energy. At very high energy levels, the film may have sufficient energy (strain energy due to point defects, dislocations, etc. and/or temperature) to recrystallize into a more equiaxed grain structure that is very dense and thermodynamically stable. The XRD data (peak width at half-maximum) provide us with another important and unique feature of the anatase and rutile phases present in the films. The rutile crystals tend to be approximately 10-20 nm in diameter (each rutile nanocolumn is 10-20 nm in diameter) and the anatase crystals 20-40 nm in diameter (each anatase nancolumn is 20-40 nm in diameter). Very different size ranges and shapes are characteristic of chemically synthesized anatase and rutile.

Figure 2A:
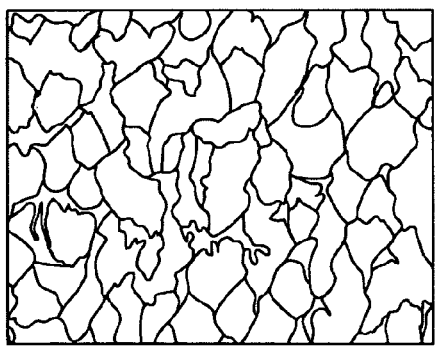
FIGS. 2a and 2b illustrate the as-deposited nanocomposite titania film structure (FIG. 2a-plan view and FIG. 2b-cross-section) of low angle deposited film (normal oxygen content).
Figure 2B:
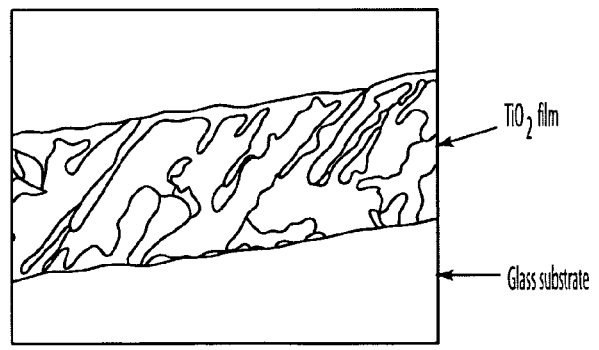
Figure 3A:
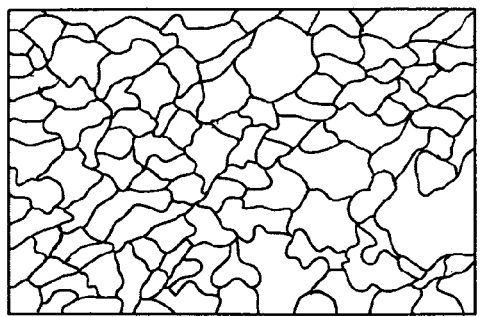
FIGS. 3a and 3b illustrate the as-deposited nanocomposite titania film structure with less oxygen (FIG. 3a) no $N_2$ and (FIG. 3b) $N_2$ stabilized.
Figure 3B:
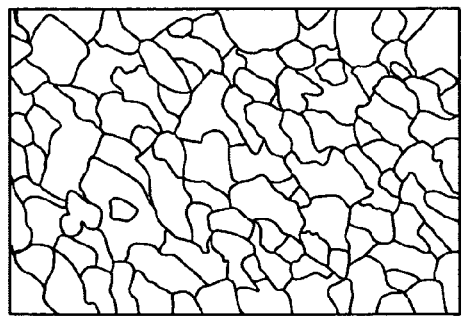
Figure 4:
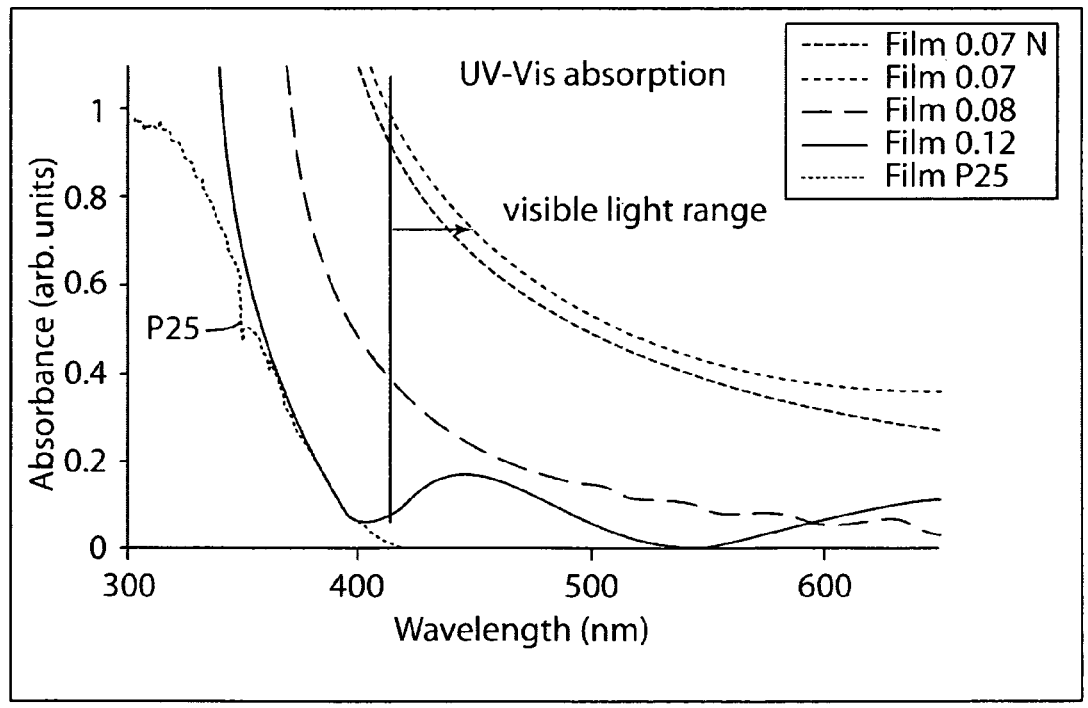
FIG. 4 shows UV-Vis absorption results of titania films prepared under different oxygen partial pressure and P25 coated films where Film 0.07N: $O_2$: 0.07 Pa, with minimum nitrogen; Film 0.07: $O_2$: 0.07 Pa, with no nitrogen; Film 0.08: $O_2$: 0.08 Pa; Film 0.12: $O_2$: 0.12 Pa and a P25 dip coated film.

Typical structures are columnar, with 100-500 nm diameter column bundles comprised of 10-40 nm diameter columnar anatase and rutile crystals intermixed. The most reactive films were also deposited at a low angle (−30 degrees) which created columnar structures that grew at about 45 deg. to the substrate. The low angle deposition is believed to create a more open structure (open column boundaries) with effectively increased reactive surface area. The degree of openness was not necessarily optimized since other deposition angles (less than 30 deg.) should produce increasing openness with decreasing angle. Low angle deposition could also affect the predominant nature of anatase/rutile interfaces and orientations through selective growth processes, and this may also enhance performance. The "nature" of the anatase/rutile interface seems to be important to optimize the functionality of the material and it may be that this interface favors the creation and stability of certain "defects" including oxygen vacancies and certain oxygen coordinations of Ti-cations (e.g. tetrahedral vs. octahedral $Ti^{4+}$). The SEM images in FIGS. 2a and 2b show the top surface of such a film and the columns in cross-section, respectively. The "fish-scale" appearance is common for the low angle deposited films and is useful to make clear the dual columnar structure of the film. The larger bundles are easily recognized as features with 100-500 nm dimensions, while smaller column tops are visible within the bundles, and these (though less easily resolved in SEM) have dimensions in the 10-40 nm range. Other deposition conditions produce variants on this structure; for example, FIGS. 3a and 3b show the surface topography for a film that is even more reactive than those in FIGS. 2a and 2b. It has the same ratio of anatase to rutile (70:30), but is highly nonstoichiometric in terms of oxygen content. The structure still appears to be $TiO_2$, the film is visibly darkened, and indeed shows a marked red-shift in photoresponse (absorbance in the visible wavelength range) (FIG. 4). This shift is greater than that reported by others exploring this effect and trying to control oxygen vacancy concentration through annealing procedures.

In the past, workers have used annealing treatments in air to achieve different oxygen vacancy levels, but this effect is limited by thermodynamic considerations. In contrast, the invention provides titania films that are active as-deposited, and the level of oxygen vacancy concentration is directly determined by controlling the partial pressure of oxygen in the reactive deposition. This vacancy concentration is difficult to measure in the films, but the oxygen partial pressure is readily determined during deposition and can reproducibly produce these active titania structures.

Partial pressure control is used because of the nature of the reactive sputtering process, which also forms reaction products on the surface of the sputtering target. As described above, control of the partial pressure of reactive gases is achieved using feedback from a mass spectrometer. If this reaction is not controlled, the sputtering process is slowed and totally changed to a process controlled by the surface coating on the target (in this case—$TiO_2$), which severely limits the range of structure, composition, and deposition rate for the film. Oxide formation on the target surface is also the source of electrical arcing during the process, and this destabilizes the process too.

The non-stoichiometric titania films with low oxygen content are formed at the limit of process stability, since at very low oxygen content the target surface will oscillate back and forth from metallic mode to oxide mode, to a greater or lesser extent, depending on electronic control system feedback and response time, and certain other conditions such as total gas flow (pumping) rates relative to the pumping (capture) effect of the target. In this invention, it was determined that the use of a very small amount of nitrogen gas in the system helped to stabilize the sputtering process (reduced the oscillations in oxygen partial pressure/flow), thereby allowing more reliable/controllable low-oxygen concentrations to be achieved. The nitrogen content of the films under these conditions, however, is not detectable by ordinary means (EDS or XPS). The nitrogen does however, impact the film growth, apparently facilitating kinetic processes (adatom mobility) and the resulting structure (bundle size and the exact conditions for getting the desired anatase:rutile ratio, but the Ti:N bond gives way to the Ti:O bond which is energetically favored. The film growth proceeds as if it has greater energy input compared to films grown without nitrogen but the same oxygen content.

As mentioned above, other methods have been adopted to solve the reactive sputtering problems of target poisoning (target reaction with the oxygen) and arcing. These include twin-cathode a-c sputtering [59], use of indirect partial pressure feedback signals such as target voltage or optical emission of ionized species (OES) [references 60, 61], and arc suppression systems such as pulsed target power supplies [reference 62], etc. To the extent that they allow access to the low oxygen concentration, and mixed phase nano-structures that this invention creates, they may also be employed in practice of the invention. Of course, non-sputtering methods may also be adapted to create the preferred nanocomposite titania structures. Examples of other PVD techniques are pulsed laser (ablation) deposition (PLD) [reference 63] which is a relatively recent technique, and thermal or electron beam evaporation [references 64, 65], which are more mature technologies.

Figure 5:
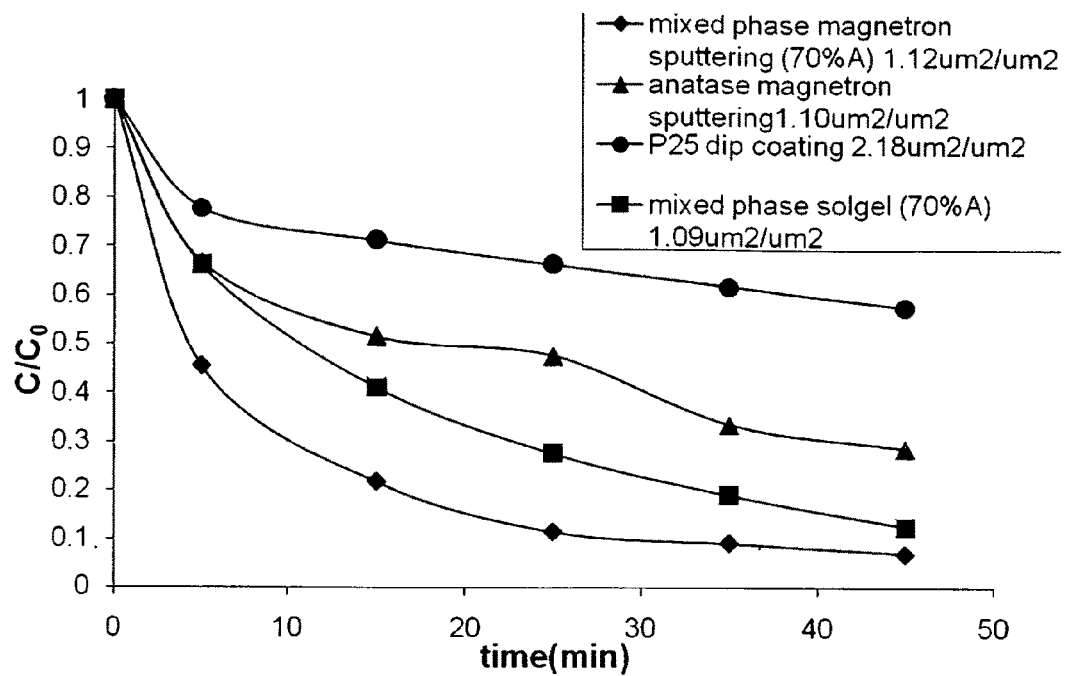
FIG. 5 shows oxidation of acetaldehyde by sputtered titania films, sol-gel films, and P25 films (The surface area here is expressed as the ratio of the measured surface area to the nominal or projected area in order to normalize the reaction rates with respect to surface area.) under UV illumination. The initial sputtered titania films may not be fully stoichiometric, but they are far more so than intentionally $O_2$-deficient sputtered titania films developed later pursuant to the invention and described below.

The demonstration of high photocatalytic activity is shown in FIGS. 5-8. Initial work involved the oxidation of acetaldehyde in the gas phase reactor, exposed to UV-light as described below in a batch reactor system, FIG. 8*a*. FIG. 5 shows how initially optimized films (at that time) designated by solid diamond data points and solid triangle data points were far superior to conventional $TiO_2$ in terms of the rate and amount of acetaldehyde reduction as a function of time. The measurements were made in a closed cell attached to a gas chromatograph with thermal conductivity detection as described in reference 6.

Figure 6:
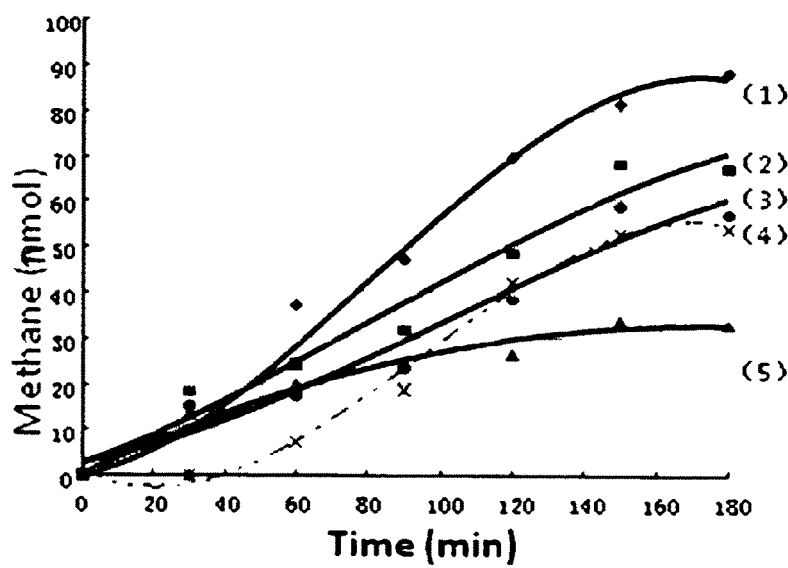
FIG. 6 shows the production of methane from $CO_2$ reduction by various samples (with similar $O_2$ content) normalized by the surface areas of the titania films under UV light and with isopropanol added. The surface area here is expressed as the ratio of the measured surface area to the nominal or projected area. (1) mixed phase magnetron sputtered film (70% anatase, low angle) (1.12 $um^2/um^2$); (2) mixed phase magnetron sputtered film (70% anatase, high angle) (1.085 $um^2/um^2$); (3) anatase, magnetron sputtered film (1.10 $um^2/um^2$, low angle); (4) P25, dip-coated film (2.24 $um^2/um^2$); (5) rutile magnetron sputtered film (1.09 $um^2/um^2$).

Additional work has further optimized the non-stocihiometric titania film structures, by introducing the control of oxygen vacancies with nitrogen stabilization of the sputtering process. This work focused on the generation of fuels from solar energy by photocatalytic conversion of $CO_2$ to methane and other hydrocarbon products. While the potential for this reaction was often discounted as improbable, applicants have shown it to be possible. The titania film structures shown in FIGS. 2*a*, 2*b* and 3*a*, 3*b* above have been tested in a closed cell reactor (batch type), and a sample of the results is shown in FIG. 6 for UV light activation and in FIG. 7 for visible-light activation.

In this further work, to determine the influence of total pressure on $TiO_2$ phase composition, two levels were used in this Example: 0.35 Pa for rutile or rutile-dominant mixed phase films and 0.5 Pa for anatase or anatase-dominant mixed phase films. The partial pressure of oxygen was kept constant at 0.1 Pa. The sputtering power levels varied from 4.7 kW to 5.5 kW to cover the transition from anatase to rutile-dominated films. Higher power levels promoted the formation of the rutile phase. An RF substrate bias (−100 volts) was also applied as an extra energy input to foster the growth of rutile. A stationary mode was used to control the deposition angles to study the influence of deposition angle on films' structure and morphology. Shown in FIG. 1*a* and based on earlier work, low-angle (around 30 degrees and film thickness averaged about 400-500 nm) and normal-angle deposition (film thickness was about 800-1000 nm) were chosen for the sputtering process. The sputtering deposition was repeated on Al foil substrates and we dissolved the substrates away in HCl solution without altering the film structures. This allowed preparation of powders for EPR analysis.

A mixed-phase $TiO_2$ thin film was also prepared from Degussa P25 by dip-coating on glass slides and was used as a reference for photoactivity comparison.

Structural characterization of the crystalline phase composition of the prepared samples was determined by X-ray Diffraction (XRD, Rigaku) using Cu—Kα radiation operated at 40 kV-200 mA. The ratio of peak areas of the different phases was interpreted as the weight percentage of different phases of the films. UV-Visible Spectroscopy (Hitachi U-2000) was used to measure the spectral features of the films. Observation of surface morphology and quantitative analysis of the surface area of the films were determined by scanning electron microscope (SEM, LEO Gemini 1525, operated at 5 kV) and atomic force microscope (AFM, JSPM-5200, tapping mode), respectively. The high resolution images of cross-section film nanostructures were obtained with transmission electron microscope (TEM, Hitachi HF-2000, operated at 200 kV). The samples were also analyzed by electron paramagnetic resonance spectroscopy (EPR) at Argonne National Laboratory. The details of EPR and sample preparation are explained in G. Li et al. J. Mol. Catal. A. Chem. 275, 2007, p. 1176.

Figure 8:
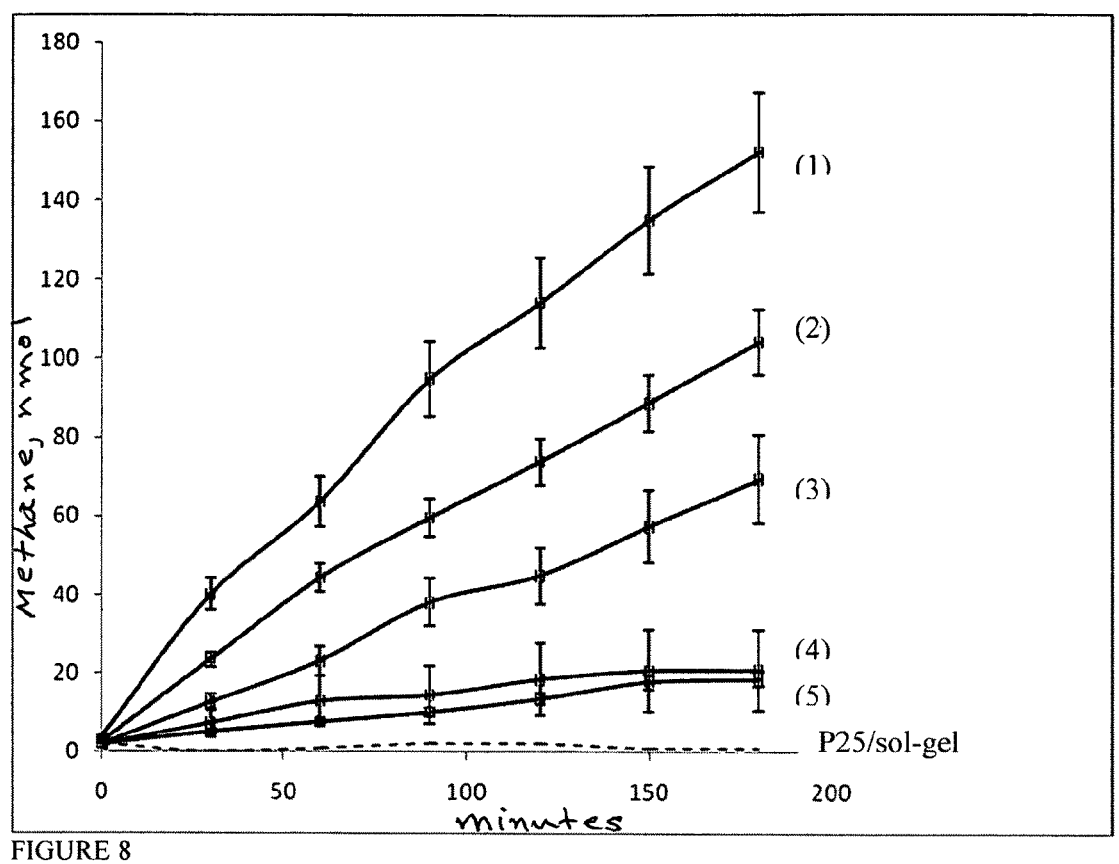
FIG. 8 shows reduction of $CO_2$ (with water) to produce methane under UV illumination by titania films with different stoichiometry where Film (1): $O_2$: 0.07 Pa, with minimum nitrogen; Film (2): $O_2$: 0.07 Pa, with no nitrogen; Film (3): $O_2$: 0.08 Pa; Film (4): $O_2$: 0.035 Pa; Film (5): $O_2$: 0.12 Pa; and P25 films and sol-gel films have no detectable reactivity with water as hole scavenger.
Figure 8A:
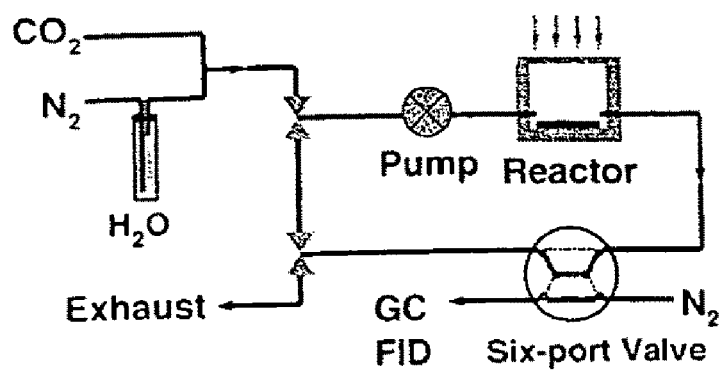
FIG. 8a shows a batch reactor system for the $CO_2$ testing having a gas chromatograph GC equipped with a flame ionization detector (FID) to monitor the products of $CO_2$ photoreduction.

The functional characterization of sputtered $TiO_2$ thin films was carried out by photoreducing $CO_2$ to methane or methanol in a gas phase batch reactor system (FIG. 8*a*). The system consisted of a square Teflon™ container connected to a circulating pump, injection port, and pretreatment equipment. The pretreatment procedure included evacuating $O_2$ by flowing $CO_2$ and nitrogen with water vapor over the film surface for 45 mins; water in the system served as a hole scavenger. Typically, much stronger hole scavengers, such as isopropanol, are employed in other studies, and initially, we also used isopropanol. However, applicants conducted a series of experiments with only $CO_2$ and water ($CO_2$:$H_2O$=3: 1). A 1-inch square glass slide covered with $TiO_2$ was placed at the bottom of the Teflon™ container, which was covered by a UV light filter (cut off at 400 nm). The system was illuminated from above with either UV or visible light. The UV lamp was a mercury vapor UV lamp (100 W), providing light at a wavelength of 365 nm and an energy density of ~21.7 mW/cm$^2$. The visible lamp was a solar light lamp (SYLVANIA, 20 W) (full solar spectrum). An HP 5890 gas chromatograph equipped with a flame ionization detector (GC-FID) monitored the products of $CO_2$ photoreduction. The mixed phase, non-stoichiometric titania ($TiO_{2-x}$) material pursuant to the invention can use water as both the hole scavenger and proton donor without the need for a sacrificial hole scavenger such as isopropanol.

Optimization of reaction conditions was carried out after determining the feasibility of $CO_2$ photoreduction and identified the sample with the best photoactivity. First, samples were pretreated by thermal evacuation under helium flow and oxidation at 300° C. (without causing phase transition) to vacate the surface and trapping sites. Then, applicants investigated the effects of three factors in order to optimize the reaction conditions: reaction temperature, $CO_2$ concentration, and reaction volume (amount of reactive gases). Temperature was increased by placing the reactor on a hot plate, heated to around 80° C. $CO_2$ concentration was tested at low (around 6-8% vol) and high (around 45-50% vol) levels, and was monitored using GC with thermal conductivity detection (TCD). The volume was increased using a gas bottle (125 ml) attached to the reaction system as a way to increase the total mass in the system. The optimization was carried out using a fractional factorial design.

Results:

In making the mixed phase, non-stocihiometric thin titania films, there was a correlation of higher power input favoring rutile crystal growth, whereas the anatase phase dominates under low power input. Mixed phase films of both anatase and rutile are made at intermediate power levels. Independent of power input level, the RF bias also contributes to the production of a high energy environment for growing rutile, since the bias voltage determines the energy of the $Ar^+$ ions bombarding the film during growth. Higher angle deposition tends to produce the phases stable at a higher energy level, i.e., rutile or a higher proportion of rutile, whereas lower angle deposition tends to produce anatase or a higher proportion of anatase than under the same conditions at the higher angle deposition.

The average crystallite size was calculated from XRD results by Scherrer's equation (A. Taylor, X-ray Metallography, Wiley, New York, N.Y. 1961). For the mixed phase and pure anatase sputtered films, rutile crystallites (in mixed phase films) are about 10-15 nm in diameter and anatase crystallites are larger in size with diameter of 20-40 nm (in pure anatase and mixed phase films). In contrast, the mixed phase P25 crystallites and other solvo-thermal $TiO_2$ tend to have smaller anatase (around 10 nm) than rutile (around 20-30 nm). For sputtered films, nano-scale anatase is thermally stable and grows faster than rutile below 600° C., but rutile can still form because of the ion assisted deposition.

Mixed phase films deposited under low angle conditions display a bundled columnar structure and scale-like surface texture (see FIGS. 2a, 2b). This unique structure is associated with high photocatalytic oxidative activity. TEM diffraction patterns of selected areas illustrated that anatase and rutile crystals were completely mixed together within the column bundles, indicating that a high density of rutile-anatase interfaces were produced. The cross section images from both SEM (FIG. 2 b) and TEM show the side profiles of the column bundles (about 100-300 nm in diameter) growing close together at an angle of about 45° to the substrate. These larger bundles appear to be made up of smaller columns of anatase and rutile crystals (10-40 nm), introducing additional interface area, perhaps of a different nature than that between the column bundles.

The photoreduction of $CO_2$ was compared for five films in the batch reactor: four magnetron sputtered samples (pure anatase, pure rutile, and two mixed phase deposited at different angles), and one P25 sample. All the mixed phase samples including Degussa P25, were composed of around 70% anatase and 30% rutile (see FIG. 6). In order to correct for the effect of varying surface area, the surface area of the 70% anatase sputtered sample (curve #1 in FIG. 6) was set as a standard and all other films' surface areas were normalized to the standard. Exposed surface areas were measured by AFM.

The main product detected and measured from the reaction of each film was methane. Trace amounts of methanol were also detected but the concentrations were too low to quantify. FIG. 6 compares the methane production from $CO_2$ reduction for the five samples under UV exposure. The initial reaction conditions (room temperature, $CO_2$ to water ratio about 3:1) were chosen based on the existing experimental set-up. Isopropanol also was used as an additional hole scavenger for this set of reactions. The results in FIG. 6 showed that sputtered films, especially the mixed phase composition created at low deposition angle, displayed the best overall photocatalytic performance. Both pure anatase and mixed phase sputtered films had similar initial rates in reducing $CO_2$ to methane over the first 30 minutes. However, all the mixed phase sputtered samples displayed greater extent of reaction compared to single phase sputtered samples. In addition, at the same phase composition, the low angle deposited films displayed higher activity than the films deposited at a normal sputtering angle. The pure phase rutile film displayed the lowest methane yield, although in general, the sputtered rutile tended to be more active than most pure phase commercial or sol-gel synthesized rutile catalysts. The difference in activity for low angle and normal angle films may be explained by the differences in the surface structures. These trends in $CO_2$ reaction are consistent with previous observations on the degradation of acetaldehyde, indicating that mixed phase sputtered $TiO_2$ films have enhanced reactivity for both oxidation and reduction reactions. Mixed phase P25 films had relatively slow initial rates but an extent of reaction comparable to the pure phase anatase film.

Figure 6A:
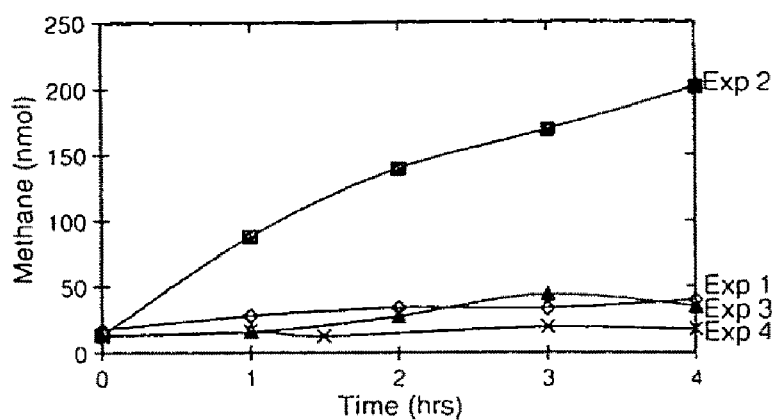
FIG. 6a shows the results of optimizing reactor conditions (on a mixed-phase sputtered low angle film under UV conditions by a fractional factorial designed experiment. Exp. 1—low $CO_2$, concentration (approx. 8% volume), room temperature, no extra volume; Exp. 2—high $CO_2$, concentration (approx. 45% volume), heated reactor (hot plate temperature was approx. 80 degrees C.), no extra volume; Exp. 3—low $CO_2$, concentration (approx. 6% volume), heated reactor (hot plate temperature was approx. 80 degrees C.), extra volume; and Exp. 4—high $CO_2$, concentration (approx. 49% volume), room temperature, extra volume.

Optimization of the reaction conditions for greater $CO_2$ conversion was sought. The optimization was carried out with the most effective mixed-phase sputtered sample under UV illumination. A fractional factorial experimental design was used to compare the effects of temperature, reactor volume and $CO_2$ concentration on methane production. As shown in FIG. 6a, higher methane yields were produced under the optimal combination of high $CO_2$ concentration (approximate 45% volume) and elevated temperature (approximately 80° C.) without extra volume. In contrast, much less methane was produced for both Exp. 3 (low $CO_2$ concentration and elevated temperature) and Exp. 4 (high $CO_2$ concentration and room temperature). These results indicate that there is a synergistic effect between $CO_2$ concentration and temperature. At the end of the reaction, the $CO_2$ conversion was 12% calculated from TCD measurement. This finding concurs with literature reports that elevated reaction temperature increases the reaction efficiency. The addition of heat also caused the production of several other hydrocarbons, albeit at small yields. The products have been identified as $C_2H_6$ and $C_3H_8$, and possibly $C_2H_4$, $C_3H_6$, in addition to methane. The ratio of water vapor to carbon dioxide is very critical to the reaction as well. In the current reaction system which is under atmospheric pressure and ambient temperature (only the reactor container could be heated), the water vapor concentration was relatively low and could not be adjusted independent of $CO_2$ concentration. Thus, the ratio of water vapor to $CO_2$ was reflected by $CO_2$ concentration in this study. Further modification of the reactor system can be made to be able to separately control the water vapor while keeping $CO_2$ concentration constant.

Figure 6B:
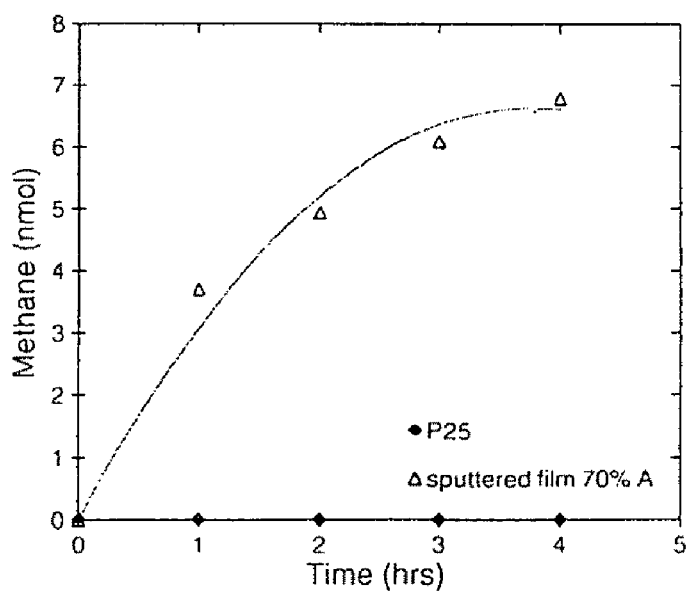
FIG. 6b shows the production of methane from $CO_2$ by a mixed phase magnetron sputtered film (70% anatase, low angle) and a dip-coated P25 film under a solar lamp without isopropanol.
Figure 7:
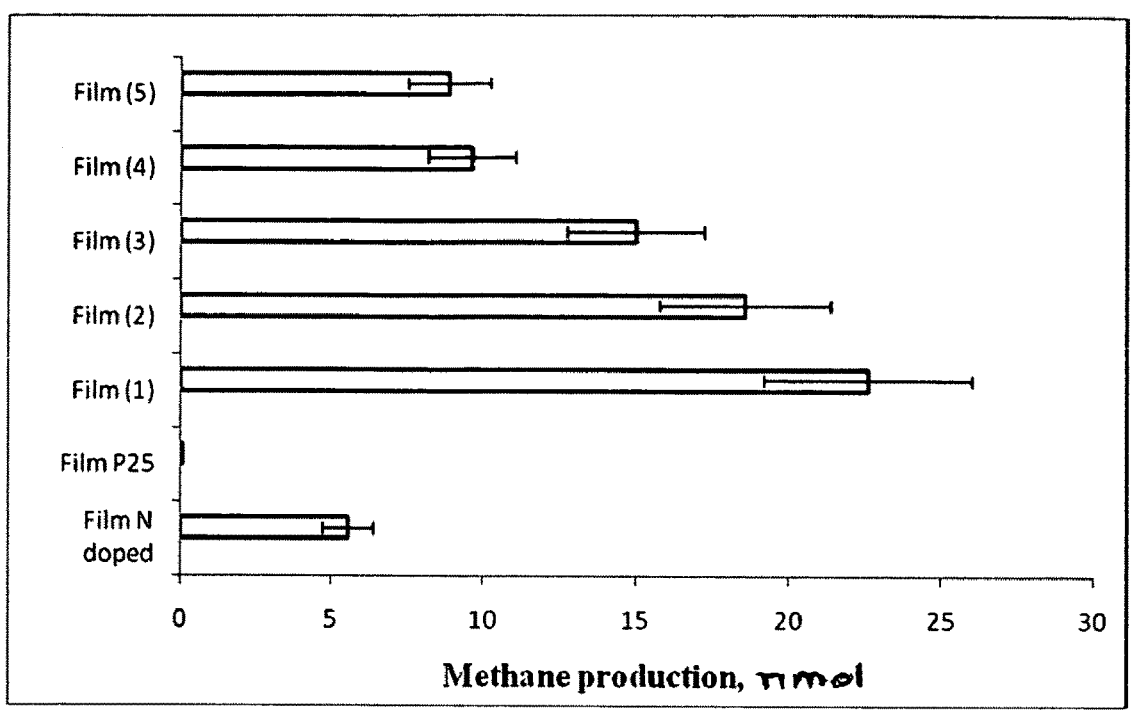
FIG. 7 shows the reduction of $CO_2$ (in the presence of water) to produce methane under visible illumination for titania films with different stoichiometry, compared to P25 and N-doped films where Film (1): $O_2$: 0.07 Pa, with minimum nitrogen; Film (2): $O_2$: 0.07 Pa, with no nitrogen; Film (3): $O_2$: 0.08 Pa; Film (4): $O_2$: 0.035 Pa; and Film (5): $O_2$: 0.12 Pa.

FIG. 4 shows the UV-Visible absorption edges for the sputtered mixed phase film in comparison with P25. A strong red shift is observed in the low angle sputtered mixed phase film. FIG. 6b shows that the low-angle-deposited mixed-phase $TiO_2$ film was able to reduce $CO_2$ under visible light with only water serving as the oxidant. While under these conditions the methane yield was much less than that produced under UV illumination, it is important to note that the visible light intensity was five times less than the UV source. In contrast, P25 showed no detectable photoactivity under these conditions without an additional hole scavenger other than water. Since the light absorption range (up to 550 nm wavelength) of the mixed phase sputtered sample far exceeded that of rutile (around 410 nm in wavelength), the sputtering process creates other color centers and/or surface states to cause such a strong red shift.

Figure 9:
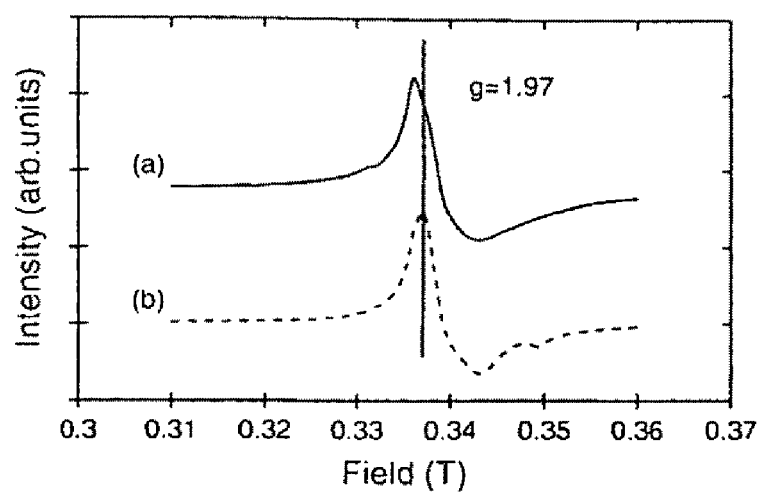
FIG. 9 shows X-band EPR spectra of (a) sputtered powder titania sample and (b) $Ti_2O_3$. The spectra was recorded in the dark at 4.5K. The resonance characteristic of $Ti^{+3}$ at g=1.97 is labeled.

FIG. 9 shows the EPR signature of sputtered powder samples under dark conditions. The EPR spectrum of $Ti_2O_3$ shows a strong resonance at g=1.97 characteristic of paramagnetic $Ti^{3+}$ sites. Although the sputtered powder sample is greyish in comparison to the black $Ti_2O_3$, the EPR signatures of the two powder samples are very similar to each other. This indicates the existence of a significant amount of partially reduced Ti in the sputtered powder sample bulk, whereas XRD patterns of the films' surface and top layers are mostly consistent with mixed phase $TiO_2$. Oxygen vacancies are commonly observed in the sputter deposition of metal oxides. Some studies have pointed out that non-stoichiometry may account for the visible-light response of the deposited materials [33, 34], which is consistent with our activity test and optical measurement.

DC magnetron sputtering was used to prepare a variety of mixed phase $TiO_2$ films on borosilicate glass slides. A series of sputtered films prepared at different deposition angles and having different phase compositions, were compared to a P25 film in a test that measured $CO_2$ reduction under UV or visible illumination. A sputtered mixed-phase film (70% anatase, 30% rutile), deposited at low angle proved to be far superior to the other films as measured by the initial rate and extent of reduction with $CO_2$. Optimization of reaction conditions was also carried out, and the coupling of elevated temperature and high $CO_2$ concentration produced a ~12% $CO_2$ conversion to methane. The catalytic performance of sputtered films are directly associated with the film structures controlled by different fabrication conditions. From both SEM and TEM observations, we see columnar bundles of anatase/rutile nanocolumns grown in the sputtered films. This confirms the existence of abundant anatase-rutile interfaces, which we believe is associated with the enhanced photocatalytic performance of the films. Our sputtered films also displayed an enhanced visible light response and reactivity that is consistent with non-stoichiometric, oxygen deficient features. The results of this Example demonstrate the important improvements in visible light harvesting and $CO_2$ reduction achieved with sputtered mixed phase $TiO_2$ composites. By coupling these enhanced material characteristics to optimized reaction conditions, we have also improved methane yields pointing to the feasibility of solar fuel generation by sputtered films.

There is a strong tendency of increasing methane production with mixed phase, non-stoichiometric titania films produced with decreasing oxygen partial pressure within the transition deposition mode (oxygen partial pressures of 0.07-0.12 pa). The films deposited at the turning point of the transition mode and metal mode had the highest methane yields. Nitrogen not only stabilizes the oxygen control during the deposition process but also contributes to the increase in photo-activity of the titania catalyst deposited at the oxygen partial pressure of 0.07 pa. In general, the methane yields under visible light conditions for all films are less than those produced under UV conditions.

This Example demonstrates the deposition of metastable non-stoichiometric titania nanocomposite structures to maximize mixed-phase interfacial area, with nanoscale structures and a high concentration of oxygen vacancies. The photocatalytic thin films are characterized by the following key features:

1) columnar structures where larger grains/columns (100-500 nm dia.) consist of bundles of smaller columns or crystallites of anatase (20-40 nm dia.) and rutile (10-20 nm dia.) where the rutile phase is uncharacteristically small especially relative to the anatase phase and where both phases are very small (e.g. less than 50 nm diameter columns) (other growth processes may produce other geometric structures, but the nanoscale, high A:R interfacial area is important), 2) an optimal ratio of 70% anatase to 30% rutile. (This ratio may maximize the anatase:rutile interface area and active catalytic sites for our growth modes and optimizes the charge separation phenomenon) Other ratios around this optimum can also be effective and the 70:30 ratio is a nominal or approximate number in a range of 50-80% anatase), and 3) oxygen vacancy concentrations determined by the lowest oxygen partial pressure regime during synthesis that will allow $TiO_2$ mixed phase structures to form. There may be an optimum value/concentration that depends on the synergistic relationship of crystallite size and/or mixed-phase interface area with oxygen partial pressure during synthesis. With the synthesis method described, the use of very small (trace) amounts of nitrogen enables the necessary control of oxygen to achieve the desired mixed phase, non-stoichiometric (oxygen deficient) titania photocatalyst films. There are two classes of applications for the photocatalytic material of the invention. The first would be various environmental applications for air or water treatment that typically rely on the enhanced oxidative capacity of the material. Some examples for air treatment could be in cabin air treatment in air planes, HVAC systems in buildings, in air protection for combat vehicles. Examples for water treatment could be in standard drinking water treatment, water recycling and reuse, especially for ultrapure water where chemical residuals are undesired, and industrial wastewater treatment. The second application is related to energy and energy efficiency concerns. The incorporation of rutile and oxygen vacancies into the composite extends the photoresponse into the visible light region, which allows more solar light to be harvested. Photoreduction of $CO_2$ to methane is a solar fuel generation application, which our results illustrate to be feasible. The energy efficiency application would be to use the materials in the photo-oxidation or photo-reduction of unwanted components in air or water to allow higher degrees of recycle and reuse. Specifically, in air handling, these materials could be used in an illuminated filter to degrade unwanted chemical components and allow higher degrees of air recycling, which in turn increases fuel efficiency on airplanes or reduces air heating or cooling costs in buildings.

EXAMPLE 2

This Example further demonstrates preparation of photoreactive and visible light responsive non-stoichiometric mixed phase titania by reactive DC (direct current) magnetron sputtering wherein trace amounts of nitrogen were added to the sputtering gas without being incorporated into the titania films. Based on the $CO_2$ photo-reduction tests using the batch reactor system of FIG. 8a and structural and optical characterization, the influence of the trace nitrogen on sputtered non-stoichiometric $TiO_2$ was studied and was compared to nitrogen doped titania. A trace nitrogen input influences not only the sputtering process, but also the structure, properties and function of non-stoichiometric $TiO_2$-based catalysts.

Nitrogen was introduced into the sputtering process for the range of oxygen partial pressures ($pO_2$) from 0.08 pa (most stoichiometric oxide film) to $pO_2$=0.07 pa (the transition mode—metallic mode turning point), at which point the oxygen level became very difficult to control, and then to $pO_2=0.035$ pa in the metallic mode which is too low to make $TiO_2$, where the oxygen flow was re-stabilized. Nitrogen partial pressure was varied ($pN_2$; from 1/20 to 1/5 of oxygen partial pressure) for each specific $pO_2$. Sputtering process details are described above in Example 1 (nominally the ranges of parameters and the chamber set up being the same), but applicants note here that rf-bias (radio frequency power) was used on the substrate and arc suppression (Advanced Energy Sparcle-V arc suppression system) was used on the target. The resulting photocatalytic activity was tested by reducing $CO_2$ (water as the reductant) to produce methane as an alternative way to store solar energy as chemical fuels. Titania films on glass slides (2.54×2.54 cm$^2$) were tested in a gas phase batch reactor under UV and visible light illumination.

The crystalline phase composition of the prepared samples was determined by X-ray diffraction (XRD, Rigaku) using Cu—K$\alpha$ radiation operated at 40 kV-200 mA. The ratio of peak areas of the different phases was interpreted as the weight percentage of different phases of the films. UV-Visible Spectroscopy (Hitachi U-2000) was used to measure the spectral absorption of light. Characterization of surface morphology and the quantitative analysis of surface areas of the films were determined by SEM (LEO Gemini 1525). Surface composition was analyzed by XPS (X-ray Photoelectron Spectroscopy, Omicron, ESCA probe). The film thickness averaged about 400-500 nm.

As the $pO_2$ was decreased from 0.07 pa to 0.035 pa, the minimum input of nitrogen to stabilize the process increased in a relative sense, until the system was re-stabilized again in the metallic mode. Films sputtered in the presence of trace nitrogen appeared more transparent compared to the original translucent grey color produced under unstable $pO_2$. However, if we kept increasing $pN_2$, the film's transmission color changed to light yellow, and then bright yellow indicating the N-incorporation and the creation of nitrogen doped films. Table 1 lists the sputtered films with different oxygen and nitrogen partial pressures.

TABLE 1

| Films | $O_2$ partial pressure | $N_2$ partial pressure | Phase composition (% anatase) |
|---|---|---|---|
| Film 1-0 | 0.07 pa (not stable) | 0 | 70% A |
| Film 1-1 | 0.07 pa | 0.0035 pa (minimum nitrogen to stabilize the deposition) | 72% A |
| Film 1-2 | 0.07 pa | 0.007 pa | 75% A |
| Film 2-0 | 0.08 pa | 0 | 70% A |
| Film 3-1 | 0.05 pa | 0.005 pa (minimum nitrogen to stabilize the deposition) | 75% A |
| Film 3-2 | 0.05 pa | 0.01 pa | 80% A |
| Film 4-0 | 0.035 pa | 0 | 70% A |
| Film N doped | 0.08 pa | 0.16 pa | 30% A |

Figure 10:
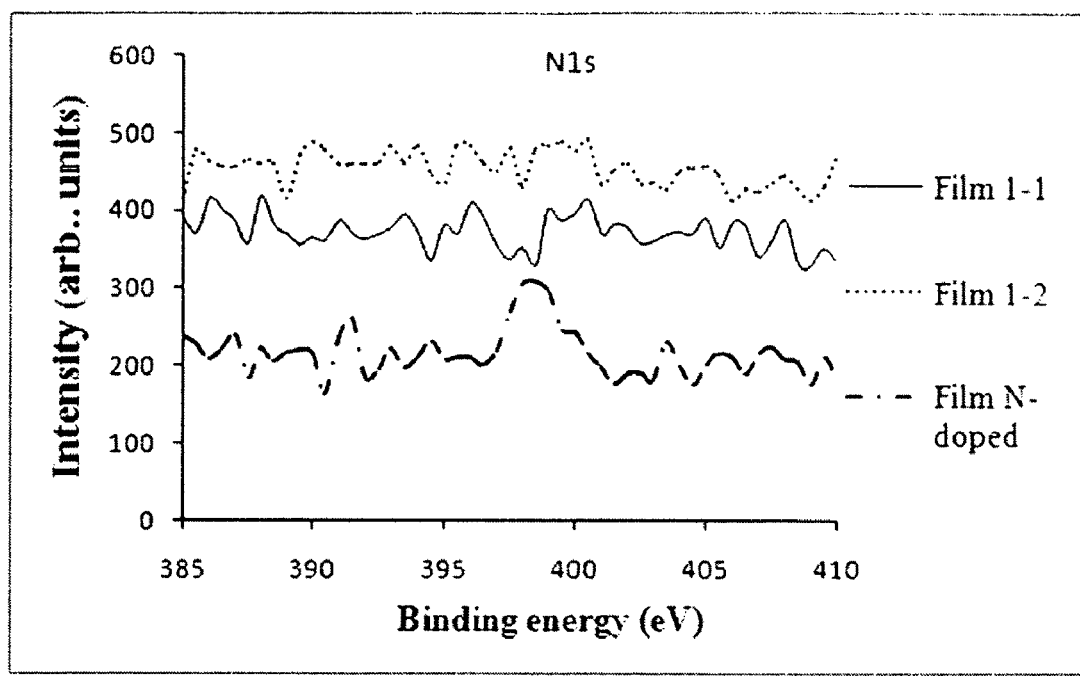
FIG. 10 shows XPS spectra of N1s for Film 1-1, Film 1-2 and Film N-doped.

FIG. 10 shows the XPS spectra of N1s for the surfaces of the films prepared under 0.07 pa of oxygen with the addition of 0.0035 or 0.007 pa of nitrogen. No nitrogen peak was detected for these two films, whereas, in the nitrogen doped film prepared at a nitrogen partial pressure of 0.16 pa (0.08 pa of oxygen), there was a small peak at a binding energy of 398.5 eV indicating the incorporation of the nitrogen in the film surface. Furthermore, we did not detect any nitrogen in the Films 1-1 and 1-2 by EDS (Energy Dispersive X-ray Spectrometer, Oxford), or with the depth profile of the ToF-SIMS (Time of Flight-Secondary Ion Mass Spectrometry, Physical Electronics, PHI TRIFT III). Thus, although we introduced trace levels of nitrogen during our sputtering process, any nitrogen in the deposited films was eventually replaced by the more reactive oxygen during film growth.

Figure 11:
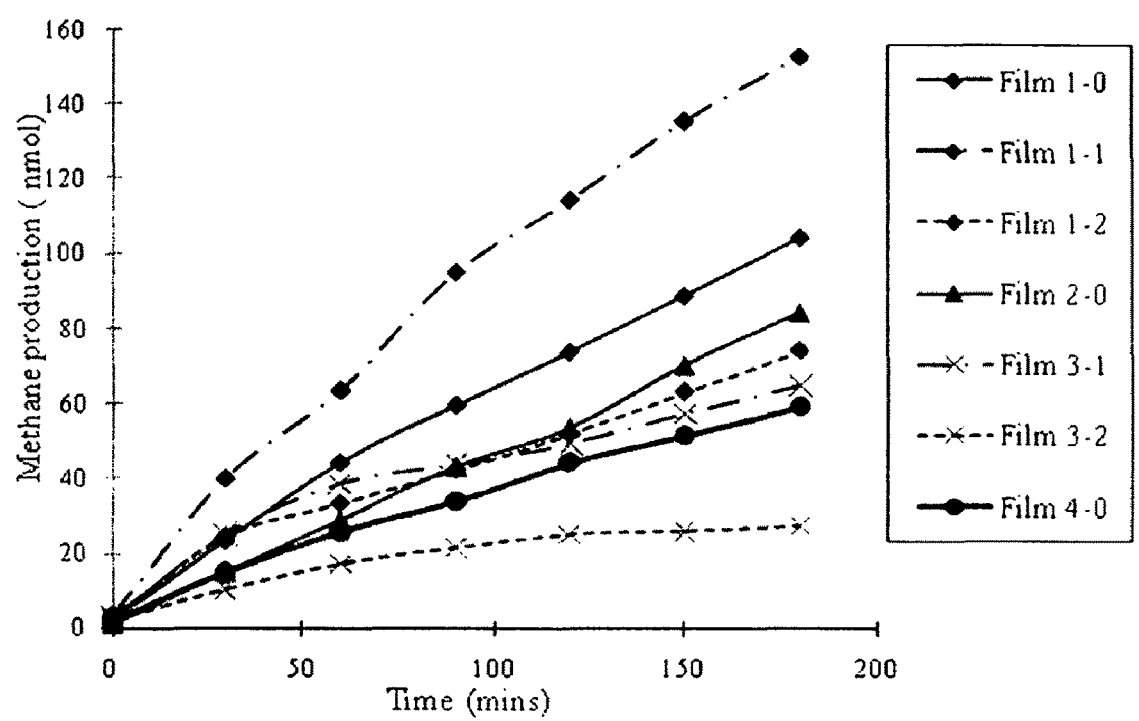
FIG. 11 shows methane production results from $CO_2$ photoreduction under UV illumination for Film 1-0, Film 1-1, Film 1-2, Film 2-0, Film 3-1, Film 3-2, and Film 4-0.
Figure 12:
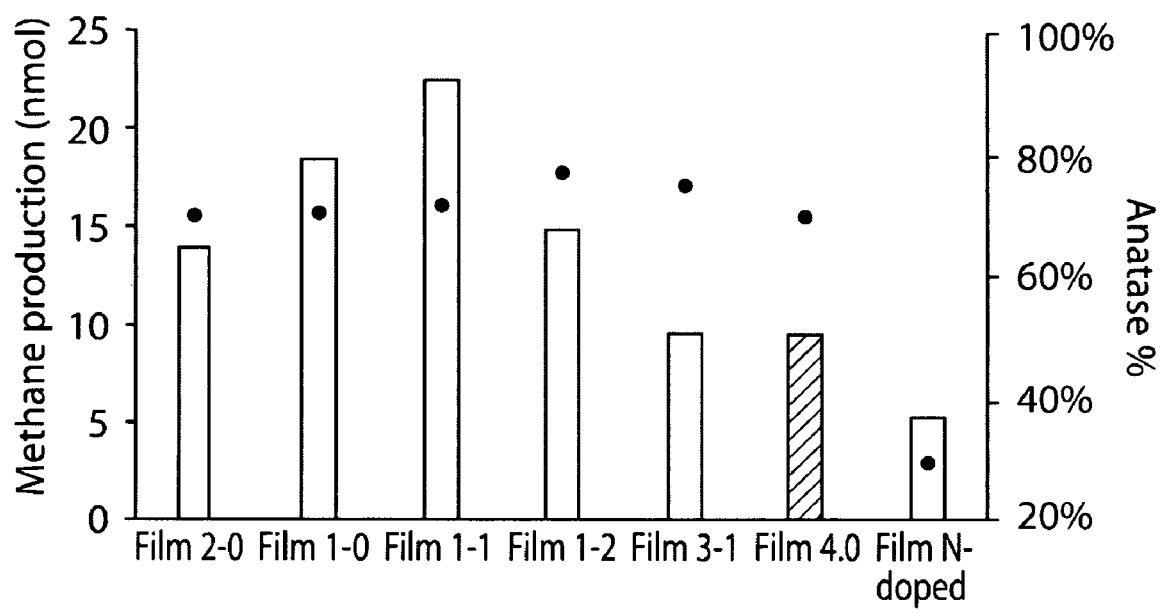
FIG. 12 shows methane production results from $CO_2$ photoreduction under visible illumination for Film 1-0, Film 1-1, Film 1-2, Film 2-0, Film 3-1, Film 4-0 and Film N-doped. Solid dots on the figure represent the anatase percentage of the mixed phase films.

FIGS. 11 and 12 show the results of the photocatalytic reduction of $CO_2$ under UV and visible light conditions. Both sets of results displayed similar trends, illustrating that there is an optimal non-stoichiometry for the titania films (in this comparison films prepared at 0.07 Pa oxygen partial pressure). Minimal addition of nitrogen (0.0035 Pa; Film 1-1) introduced during the process to stabilize the system enhanced the photo-activity of the catalysts under both UV and visible conditions. However, higher levels of nitrogen addition (e.g. $pN_2$ increased to 0.007 Pa at $pO_2=0.07$ Pa; Film 1-2) reduced the photo-activity dramatically. The nitrogen doped film displayed the lowest photo-reductive ability of all. One explanation may be that excessive nitrogen decreases the average distances between trapping sites, and thus, carriers are more easily trapped by these sites causing an increase in the recombination rate and a reduction of the reactivity. In addition, the structural change caused by the nitrogen addition may influence the activity as well. This is discussed below.

The nitrogen influence on the phase composition was studied by XRD. From FIG. 12, one observes that the percentage of anatase slightly increased with the increase of nitrogen in the reactive gas at low levels (minimum input to stabilize oxygen). In contrast, as we significantly increased the nitrogen partial pressure to create nitrogen doped films ($N_2:O_2$ from 0.3 to 1) the dominant phase was rutile (>80%; data not shown). The anatase phase, however, started to increase again when we further increased the nitrogen input ($N_2:O_2$ is >1). The initial slight enhancement of anatase in the beginning stage of nitrogen addition may be due to an improvement in the crystallinity of the mixed phase titania under growth conditions that favor anatase stability.

Figure 13A:
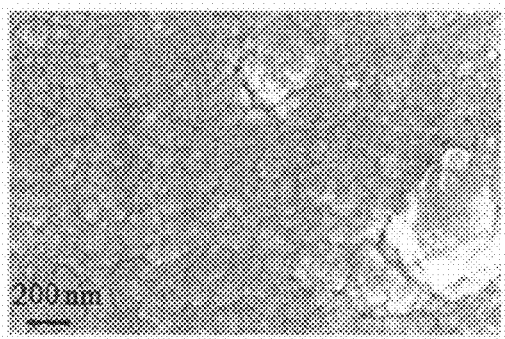
FIGS. 13a, 13b, 13c show plan-view SEM images for (FIG. 13a) Film 1-0, (FIG. 13b) Film 1-1, and (FIG. 13c) Film 1-2.
Figure 13B:
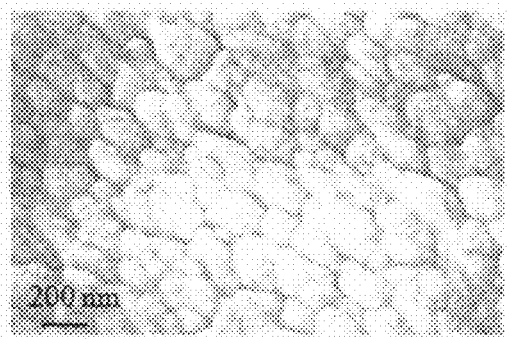
Figure 13C:
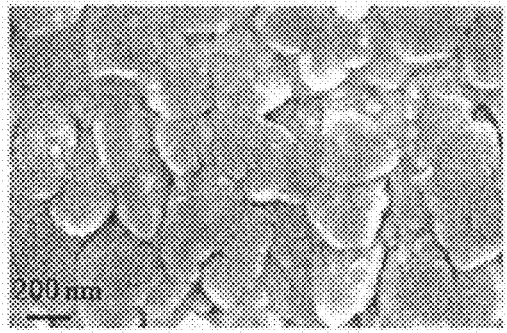

Improved crystallinity was also observed in the surface morphology of the films. FIG. 13a, 13b, 13c show the SEM images of Films 1-0, 1-1 and 1-2, respectively. The scale-like bundles of columnar structures evolved from the shadowing effect of low angle deposition. As the nitrogen input increased, the nitrogen served as additional energetic particles to bombard the substrate (with a lower sticking coefficient than oxygen atoms), which in turn, increased the atomic mobility of titanium and the bundles grew bigger. The photocatalytic activity of the non-stoichiometric titania illustrates the trade-off between creating oxygen vacancies which are mainly located at the boundaries of bundles or columns and maintaining mixed crystalline phases having desired optical, electronic and chemical properties. With respect to the surface structure, Film 1-1 was much more organized and crystalline than Film 1-0 for the reasons discussed above. Because of the smaller sizes of its bundles and columns, Film 1-1 also had larger interfacial areas, with oxygen vacancies serving as interfacial reactive sites, than Film 1-2. These structural features of Film 1-1 are believed to account for its enhanced reactivity illustrated in FIGS. 11 and 12 although applicants do not wish or intend to be bound by any theory on this regard.

Figure 14:
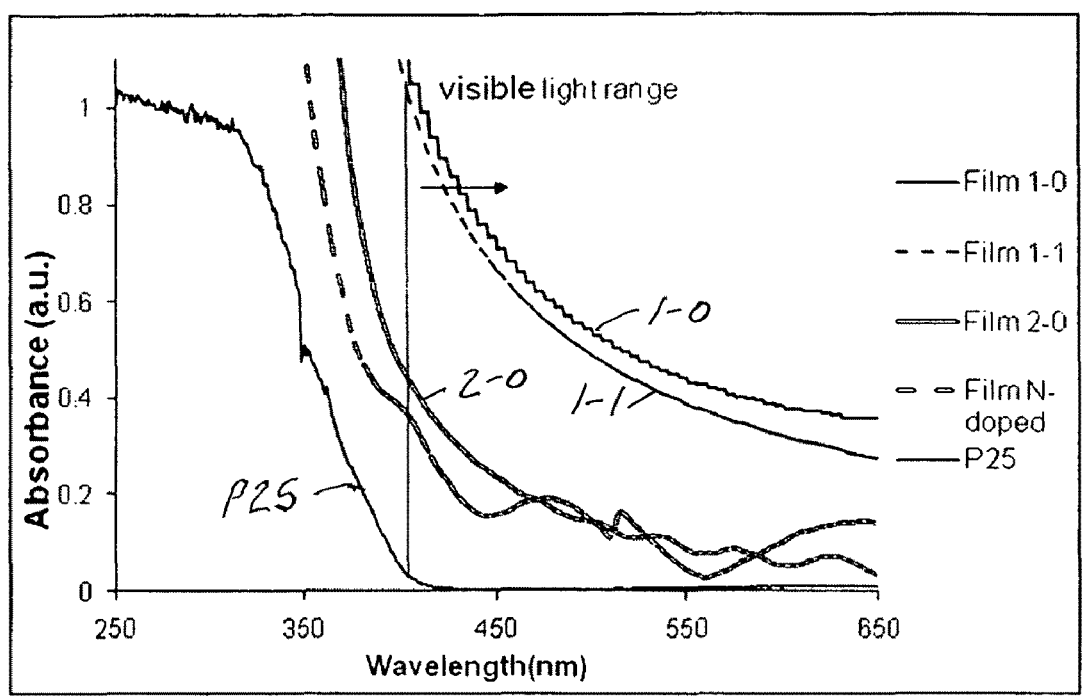
FIG. 14 shows the UV-Vis absorption spectra for Film 1-0, Film 1-1, Film 2-0, Film N-doped and a commercial standard P25 coated film.

From the spectral characterization shown in FIG. 14, both nitrogen doped and non-stoichiometric titania films produce a red shift into visible wavelengths in comparison to the commercial mixed phase titania standard, Degussa P25. The films synthesized under the optimum oxygen partial pressure of 0.07 Pa (Films 1-0 & 1-1) showed the strongest red shift. The nitrogen addition during the sputtering had negligible effect on the optical absorption spectra of non-stoichiometric titania films. In fact, all the oxygen deficient films had greater visible light absorbance than did the N-doped film.

This Example illustrates that a small nitrogen addition during reactive sputtering in the transition—metallic modes has a significant influence on the photocatalytic activity and surface structure of the synthesized non-stoichiometric titania films as well as stabilizing the sputtering process by minimizing fluctuations in the oxygen flow. The trace nitrogen input increases the crystallinity of the films in general and due to a synergy between bulk crystallinity and interfacial oxygen vacancies, the catalytic reactivity of non-stoichiometric titanias was improved. However, no nitrogen was detected in the films and the trace N-level did not significantly change the optical properties of the non-stoichiometric titania films.

Although the invention has been described with respect to certain detailed embodiments thereof, those skilled in the art will appreciate that changes and modifications can be made therein without departing from the scope of the invention as set forth in the appended claims.

References, which are incorporated herein by reference:

[1] V. M. Aroutiounian, V. M. Arakelyan, G. E. Shahnazaryan, Solar Energy 78/5 (2005) 581.
[2] A. Fujishima, K. Honda, Nature 238/5358 (1972) 37.
[3] M. Gratzel, Nature 414/6861 (2001) 338.
[4] K. Adachi, K. Ohta, T. Mizuno, Solar Energy 53/2 (1994) 187.
[5] P. Usubharatana, D. McMartin, A. Veawab, P. Tontiwachwuthikul, Industrial & Engineering Chemistry Research 45/8 (2006) 2558.
[6] M. Anpo, H. Yamashita, M. Matsuoka, D. R. Park, Y. G. Shul, S. E. Park, Journal of Industrial and Engineering Chemistry 6/2 (2000) 59.
[7] D. C. Hurum, A. G. Agrios, K. A. Gray, T. Rajh, M. C. Thurnauer, Journal of Physical Chemistry B 107/19 (2003) 4545.
[8] D. C. Hurum, K. A. Gray, T. Rajh, M. C. Thurnauer, Journal of Physical Chemistry B 109/2 (2005) 977.
[9] D. C. Hurum, A. G. Agrios, S. E. Crist, K. A. Gray, T. Rajh, M. C. Thurnauer, Journal of Electron Spectroscopy and Related Phenomena 150 (2006) 155.
[10] L. Chen, M. E. Graham, G. Li, G. K. A., Thin Solid Films 515/3 (2006) 1176.
[11] L. Chen, M. E. Graham, G. Li, D. R. Gentner, K. A. Gray, Thin Solid Films in review (2008).
[12] R. Asahi, T. Morikawa, T. Ohwaki, K. Aoki, Y. Taga, Science 293/5528 (2001) 269.
[13] M. Wong, H. Chou, T. Yang, Thin Solid Films 494 (2006) 244.
[14] S. H. Wang, T. K. Chen, K. K. Rao, M. S. Wong, Applied Catalysis B-Environmental 76/3-4 (2007) 328.
[15] V. S. Teodorescu, M. G. Blanchin, C. Garapon, C. Champeaux, Journal of Materials Science 34/22 (1999) 5469.
[16] C. Di Valentin, E. Finazzi, G. Pacchioni, A. Selloni, S. Livraghi, M. C. Paganini, E. Giamello, Chemical Physics 339/1-3 (2007) 28.
[17] A. Di Paola, G. Marci, L. Palmisano, M. Schiavello, K. Uosaki, S. Ikeda, B. Ohtani, Journal of Physical Chemistry B 106/3 (2002) 637.
[18] A. V. Emeline, N. V. Sheremetyeva, N. V. Khomchenko, V. K. Ryabchuk, N. Serpone, Journal of Physical Chemistry C 111/30 (2007) 11456.
[19] V. N. Kuznetsov, N. Serpone, J. Phys. Chem. B 110/50 (2006) 25203.
[20] N. Serpone, J. Phys. Chem. B 110/48 (2006) 24287.
[21] H. Irie, Y. Watanabe, K. Hashimoto, Journal of Physical Chemistry B 107/23 (2003) 5483.
[22] W. Y. Choi, A. Termin, M. R. Hoffmann, Journal of Physical Chemistry 98/51 (1994) 13669.
[23] T. L. Thompson, J. T. Yates, Topics in Catalysis 35/3-4 (2005) 197.
[24] H. Kikuchi, M. Kitano, M. Takeuchi, M. Matsuoka, M. Anpo, P. V. Kamat, Journal of Physical Chemistry B 110/11 (2006) 5537.
[25] I. Justicia, G. Garcia, G. A. Battiston, R. Gerbasi, F. Ager, M. Guerra, J. Caixach, J. A. Pardo, J. Rivera, A. Figueras, Electrochimica Acta 50/23 (2005) 4605.
[26] S. Takeda, S. Suzuki, H. Odaka, H. Hosono, Thin Solid Films 392/2 (2001) 338.
[27] W. D. Sproul, Journal of Vacuum Science & Technology A-Vacuum Surface and Films 13/3 (1995).
[28] W. D. Sproul, M. E. Graham, M. S. Wong, P. J. Rudnik, Surface & Coatings Technology 89/1-2 (1997) 10.
[29] D. Severin, O. Kappertz, T. Kubart, T. Nyberg, S. Berg, A. Pflug, M. Siemers, M. Wuttig, Applied Physics Letters 88/16 (2006).
[30] H. Barankova, S. Berg, P. Carlsson, C. Nender, Thin Solid Films 260/2 (1995) 181.
[31] R. Zeman, S. Takabayashi, Surface & Coatings Technology 153/1 (2002) 93.
[32] T. Torimoto, R. J. Fox, M. A. Fox, Journal of the Electrochemical Society 143/11 (1996) 3712.
[33] V. P. Solntsev, E. G. Tsvetkov, Inorganic Materials 33/10 (1997) 1055.
[34] S. Azad, M. H. Engelhard, L. Q. Wang, Journal of Physical Chemistry B 109/20 (2005) 10327.
[35] A. Markovits, B. Mguig, M. Calatayud, C. Minot, Catalysis Today 113/3-4 (2006) 201.
[36] M. Higuchi, S. Uekusa, R. Nakano, K. Yokogawa, Journal of Applied Physics 74/11 (1993) 6710.
[37] K. Prabakar, T. Takahashi, T. Nezuka, T. Nakashima, Y. Kubota, A. Fujishima, Journal of Vacuum Science & Technology A 24/4 (2006) 1156.
[38] D. Noguchi, Y. Kawamata, T. Nagatomo, Japanese Journal of Applied Physics Part 1-Regular Papers Short Notes & Review Papers 43/4A (2004) 1581.
[39] M. V. Ganduglia-Pirovano, A. Hofmann, J. Sauer, Surface Science Reports 62/6 (2007) 219.
[40] Hurum, D. C., et al., *Explaining the enhanced photocatalytic activity of Degussa P25 mixed-phase TiO2 using EPR*. Journal of Physical Chemistry B, 2003. 107(19): p. 4545-4549.
[41] Hurum, D. C., et al., *Probing reaction mechanisms in mixed phase $TiO_2$ by EPR*. Journal of Electron Spectroscopy and Related Phenomena, 2006. 150: p. 155-163.
[42] G. Li and K. A. Gray, *Preparation of Mixed-phase Titanium Dioxide Nanocomposites via Solvothermal Processing*. Chemistry of Materials, 2007. 19: p. 1176-1181.
[43] Sproul, W. D., et al., *Multilayer oxide coatings*. 1998.
[44] Chen, L., et al., *Photoreduction of $CO_2$ by $TiO_2$ Nanocomposties Synthesized through Reactive DC Magnetron Sputter Deposition*. Thin Solid Films, 2008. in review.
[45] Chen, L., et al., *Fabricating Highly Active Mixed Phase $TiO_2$ Photocatalysts by Reactive DC Magnetron Sputter Deposition*. Thin Solid Films, 2006. 515(3): p. 1176-1181.
[46] Kolen'ko, Y. V., et al., *Photocatalytic properties of titania powders prepared by hydrothermal method*. Applied Catalysis B-Environmental, 2004. 54(1): p. 51-58.
[47] Kawahara, T., et al., *Photocatalytic activity of rutile-anatase coupled $TiO_2$ particles prepared by a dissolution-reprecipitation method*. Journal of Colloid and Interface Science, 2003. 267(2): p. 377-381.
[48] Bacsa, R. R. and J. Kiwi, *Effect of rutile phase on the photocatalytic properties of nanocrystalline titania during* the degradation of p-coumaric acid. Applied Catalysis B-Environmental, 1998. 16(1): p. 19-29.

[49]. Gandhe, A. R., et al., TiO2: As a versatile catalyst for the ortho-selective methylation of phenol. Journal of Molecular Catalysis a-Chemical, 2005. 238(1-2): p. 63-71.

[50]. Gouma, P. I., P. K. Dutta, and M. J. Mills, Structural stability of titania thin films. Nanostructured Materials, 1999. 11(8): p. 1231-1237.

[51]. Zhang, H. and J. F. Banfield, Thermodynamic analysis of phase stability of nanocrystalline titania. Journal of Materials Chemistry, 1998. 8(9): p. 2073-2076.

[52]. Anpo, M. and M. Takeuchi, The design and development of highly reactive titanium oxide photocatalysts operating under visible light irradiation. Journal of Catalysis, 2003. 216(1-2): p. 505-516.

[53]. Thompson, T. L. and J. T. Yates, $TiO_2$-based photocatalysis: Surface defects, oxygen and charge transfer. Topics in Catalysis, 2005. 35(3-4): p. 197-210.

[54]. Sproul, W. D., et al., Advances in Partial-Pressure Control Applied to Reactive Sputtering. Surface & Coatings Technology, 1989. 39(1-3): p. 499-506.

[55]. Sproul, W. D., et al., Reactive Direct-current Magnetron Sputtering of Aluminum-oxide Coatings. Journal of Vacuum Science & Technology a-Vacuum Surfaces and Films, 1995. 13(3): p. 1188-1191.

[56]. Chen, L., Graham, M. E. DeSario, P. A. and Gray, K. A., Non-stoichiometric Mixed-phase Titania Thin Films: Redshifted Photoresponse and Enhanced Reactivity. 2008 (to be submitted)

[57]. Berg, S, and T. Nyberg, Fundamental understanding and modeling of reactive sputtering processes. Thin Solid Films, 2005. 476(2): p. 215-230.

[58]. Severin, D., et al., Process stabilization and increase of the deposition rate in reactive sputtering of metal oxides and oxynitrides. Applied Physics Letters, 2006. 88(16).

[59]. Szczyrbowski, J., et al., Reactive sputtering of dielectric layers on large scale substrates using an AC twin magnetron cathode. Surface & Coatings Technology, 1997. 93(1): p. 14-20.

[60]. Schiller, S., et al., On the investigation of d.c. plasmatron discharges by optical emission spectrometry. Thin Solid Films, 1982. 96(3): p. 235-240.

[61]. Sproul, W. D., Tomashek, James R., Rapid rate reactive sputtering of a group IVb metal, U. patent, Editor. 1984.

[62]. Sproul, W. D., D. J. Christie, and D. C. Carter, Control of reactive sputtering processes. Thin Solid Films, 2005. 491(1-2): p. 1-17.

[63]. Lowndes, D. H., et al., Synthesis of novel thin-film materials by pulsed laser deposition. Science, 1996. 273 (5277): p. 898-903.

[64]. Atanassov, G., R. Thielsch, and D. Popov, Optical Properties of $TiO_2$, $Y_2O_3$ and $CeO_2$ Thin films Deposited by Electron-Beam Evaporation. Thin Solid Films, 1993. 223 (2): p. 288-292.

[65]. Yao, B. D., Y. F. Chan, and N. Wang, Formation of ZnO nanostructures by a simple way of thermal evaporation. Applied Physics Letters, 2002. 81(4): p. 757-759.

[66]. Usubharatana, P., et al., Photocatalytic Process for CO2 Emission Reduction from Industrial Flue Gas Streams. Industrial & Engineering Chemistry Research, 2006. 45(8): p. 2558-2568.

[67]. Anpo, M., Preparation, characterization, and reactivities of highly functional titanium oxide-based photocatalysts able to operate under UV-visible light irradiation: Approaches in realizing high efficiency in the use of visible light. Bulletin of the Chemical Society of Japan, 2004. 77(8): p. 1427-1442.

[68]. Matsuoka, M., et al., Photocatalysis for new energy production—Recent advances in photocatalytic water splitting reactions for hydrogen production. Catalysis Today, 2007. 122(1-2): p. 51-61.

We claim:

1. A mixed phase, non-stoichiometric titania photocatalyst material that is responsive to UV and visible illumination as deposited on a substrate wherein the material is non-stochiometric in terms of its oxygen content.

2. The material of claim 1 which shows a red-shift in photoresponse (absorbance in the visible light wavelength range).

3. The material of claim 1 that comprises 50-80% by weight of anatase phase and balance rutile phase.

4. The material of claim 3 having a columnar morphology having column bundles of intermixed anatase nanocolumns and rutile nanocolumns.

5. The material of claim 4 wherein each nanocolumn of anatase is 20-40 nm in diameter and each nanocolumn of rutile is 10-20 nm in diameter.

6. The material of claim 4 wherein columnar bundles are oriented at an angle of less than 90 degrees to a flat substrate surface.

7. A method of photocatalytically reacting a reactant, comprising contacting the reactant and the photocatalyst material of claim 1 under UV or visible light illumination.

8. A method of photoreduction of carbon dioxide to methane, comprising contacting the carbon dioxide and the photocatalyst material of claim 1 under UV or visible light illumination.

9. The method of claim 8 wherein the material uses water as both a hole scavenger and proton donor.

10. A method of making a titania photocatalyst material, comprising removing titanium atoms from a target in the presence of oxygen whose concentration is limited in a manner to deposit a mixed phase, non-stoichiomeric titania material on a substrate wherein the deposited material is non-stoichiometric with respect to its oxygen content and wherein the deposited material is reactive and responsive to UV and visible illumination.

11. The method of claim 10 wherein a stabilizing gas is present in a trace amount to stabilize the removing of the titanium atoms from the target without introducing the stabilizing gas into the deposited material.

12. The method of claim 10 wherein partial pressure of oxygen is controlled in a transition mode that provides said deposited material which is non-stoichiometric with respect to its oxygen content.

* * * * *